United States Patent
Tanner et al.

(10) Patent No.: US 10,952,562 B2
(45) Date of Patent: Mar. 23, 2021

(54) BEVERAGE PREPARATION MACHINES AND BEVERAGE CARTRIDGES

(71) Applicant: Koninklijke Douwe Egberts B.V., Utrecht (NL)

(72) Inventors: Roger Geoffrey Tanner, Banbury (GB); Paul Adrian Saxton, Towcester (GB)

(73) Assignee: Koninklijke Douwe Egberts B.V., Utrecht (NL)

(*) Notice: Subject to any disclaimer, the term of this patent is extended or adjusted under 35 U.S.C. 154(b) by 558 days.

(21) Appl. No.: 15/179,436

(22) Filed: Jun. 10, 2016

(65) Prior Publication Data

US 2016/0278571 A1 Sep. 29, 2016

Related U.S. Application Data

(62) Division of application No. 12/600,588, filed as application No. PCT/US2008/063818 on May 16, 2008, now Pat. No. 9,386,877.

(Continued)

(30) Foreign Application Priority Data

May 18, 2007 (GB) .................................. 0709590.4

(51) Int. Cl.
*A47J 31/44* (2006.01)
*A47J 31/36* (2006.01)
*A47J 31/40* (2006.01)

(52) U.S. Cl.
CPC ....... *A47J 31/4492* (2013.01); *A47J 31/3628* (2013.01); *A47J 31/3638* (2013.01);

(Continued)

(58) Field of Classification Search
CPC ................ A47J 2201/00; A47J 31/3628; A47J 31/3638; A47J 31/3695; A47J 31/407;

(Continued)

(56) References Cited

U.S. PATENT DOCUMENTS 2,243,895 A 6/1941 Brown
2,715,868 A 8/1955 Brown (Continued)

FOREIGN PATENT DOCUMENTS

CA 2346550 A1 11/2002
EP 0151252 A1 8/1985

(Continued)

OTHER PUBLICATIONS

European Patent Office, Communication Under Rule 71(3) EPC dated Feb. 8, 2017, from corresponding European Patent Application No. 08755631.2, 7 pages.

(Continued)

*Primary Examiner* — Dana Ross
*Assistant Examiner* — Joseph W Iskra
(74) *Attorney, Agent, or Firm* — Fitch, Even, Tabin & Flannery LLP

(57) ABSTRACT

A delivery head for a beverage preparation machine including: an upwardly directed inlet for supplying water to a cartridge received in the delivery head; a downwardly directed outlet for outflow of beverage; a barcode reader having a barcode reader window through which signals may be transmitted; wherein the inlet, the outlet and the barcode reader window are arranged in a line with the outlet being intermediate the inlet and the barcode reader window.

6 Claims, 13 Drawing Sheets

Related U.S. Application Data

(60) Provisional application No. 60/940,118, filed on May 25, 2007.

(52) U.S. Cl.
CPC ......... *A47J 31/3695* (2013.01); *A47J 31/407* (2013.01); *A47J 2201/00* (2013.01)

(58) Field of Classification Search
CPC .. A47J 31/4492; G06F 3/0304; G06F 3/0346; G06K 9/00335; H04N 21/42206; H04N 21/4223
USPC .......................................... 426/112; 99/295
See application file for complete search history.

(56) References Cited

U.S. PATENT DOCUMENTS

| | | |
|---|---|---|
| 2,899,106 A | 8/1959 | Weinert |
| 3,292,527 A | 12/1966 | Stasse |
| 3,336,857 A | 8/1967 | Knodt |
| 3,403,617 A | 10/1968 | Lampe |
| 3,607,297 A | 9/1971 | Fasano |
| 3,805,999 A | 4/1974 | Syverson |
| D255,529 S | 6/1980 | Dziekonski |
| 4,206,694 A | 6/1980 | Moskowitz |
| 4,253,385 A | 3/1981 | Illy |
| 4,382,402 A | 5/1983 | Alvarez |
| 4,389,191 A | 6/1983 | Lowe |
| 4,452,130 A | 6/1984 | Klein |
| 4,484,515 A | 11/1984 | Illy |
| 4,551,611 A | 11/1985 | Longo |
| 4,653,390 A | 3/1987 | Hayes |
| 4,724,752 A | 2/1988 | Aliesch |
| 4,738,378 A | 4/1988 | Oakley |
| 4,744,291 A | 5/1988 | Wallin |
| 4,775,048 A | 10/1988 | Baecchi |
| 4,787,299 A | 11/1988 | Levi |
| 4,838,152 A | 6/1989 | Kubicko |
| 4,846,052 A | 7/1989 | Favre |
| 4,873,915 A | 10/1989 | Newman |
| 4,875,408 A | 10/1989 | McGee |
| 4,876,953 A | 10/1989 | Imamura |
| 4,917,005 A | 4/1990 | Knepler |
| 4,920,252 A | 4/1990 | Yoshino |
| 4,920,870 A | 5/1990 | Newman |
| 4,921,712 A | 5/1990 | Malmquist |
| 4,990,352 A | 2/1991 | Newman |
| D316,795 S | 5/1991 | Brewer |
| 5,014,611 A | 5/1991 | Illy |
| 5,063,836 A | 11/1991 | Patel |
| 5,072,660 A | 12/1991 | Helbling |
| 5,080,008 A | 1/1992 | Helbling |
| 5,111,740 A | 5/1992 | Klein |
| 5,134,924 A | 8/1992 | Vicker |
| 5,178,058 A | 1/1993 | van Dort |
| 5,183,998 A | 2/1993 | Hoffman |
| 5,186,096 A | 2/1993 | Willi |
| 5,197,374 A | 3/1993 | Fond |
| 5,242,702 A | 9/1993 | Fond |
| 5,259,295 A | 11/1993 | Timm |
| 5,265,520 A | 11/1993 | Giuliano |
| 5,272,960 A | 12/1993 | Kinna |
| 5,285,717 A | 2/1994 | Knepler |
| 5,287,797 A | 2/1994 | Grykiewicz |
| 5,303,639 A | 4/1994 | Bunn |
| 5,327,815 A | 7/1994 | Fond |
| 5,343,799 A | 9/1994 | Fond |
| 5,347,916 A | 9/1994 | Fond |
| 5,349,897 A | 9/1994 | King |
| 5,375,508 A | 12/1994 | Knepler |
| 5,387,787 A | 2/1995 | Waldron |
| 5,398,595 A | 3/1995 | Fond |
| 5,398,596 A | 3/1995 | Fond |
| 5,408,917 A | 4/1995 | Lussi |
| 5,440,972 A | 8/1995 | English |
| 5,447,017 A | 9/1995 | Becher |
| 5,455,887 A | 10/1995 | Dam |
| 5,463,932 A | 11/1995 | Olson |
| 5,472,719 A | 12/1995 | Favre |
| 5,479,849 A | 1/1996 | King |
| 5,531,152 A | 7/1996 | Gardosi |
| 5,549,035 A | 8/1996 | Wing-Chung |
| 5,603,254 A | 2/1997 | Fond |
| 5,625,706 A | 4/1997 | Lee |
| 5,638,740 A | 6/1997 | Cai |
| 5,638,741 A | 6/1997 | Cisaria |
| 5,639,023 A | 6/1997 | Hild |
| 5,649,472 A | 7/1997 | Fond |
| D389,694 S | 1/1998 | Vinson |
| 5,704,275 A | 1/1998 | Warne |
| 5,738,001 A | 4/1998 | Liverani |
| 5,755,149 A | 5/1998 | Blanc |
| 5,762,987 A | 6/1998 | Fond |
| 5,776,527 A | 7/1998 | Blanc |
| 5,794,213 A | 8/1998 | Markman |
| 5,794,519 A | 8/1998 | Fischer |
| 5,826,492 A | 10/1998 | Fond |
| 5,840,189 A | 11/1998 | Sylvan |
| 5,858,437 A | 1/1999 | Anson |
| 5,860,354 A | 1/1999 | Jouatel |
| 5,862,738 A | 1/1999 | Warne |
| 5,897,899 A | 4/1999 | Fond |
| 5,899,137 A | 5/1999 | Miller |
| 5,921,168 A | 7/1999 | Nello |
| 5,930,796 A | 7/1999 | Peirce |
| 5,943,944 A | 8/1999 | Lassota |
| 5,967,021 A | 10/1999 | Yung |
| 5,974,950 A | 11/1999 | King |
| 5,992,298 A | 11/1999 | Illy |
| 6,000,317 A | 12/1999 | Van Der Meer |
| 6,006,653 A | 12/1999 | Sham |
| 6,009,792 A | 1/2000 | Kraan |
| D419,821 S | 2/2000 | Powell |
| 6,021,705 A | 2/2000 | Dijs |
| 6,029,104 A | 2/2000 | Kim |
| D423,863 S | 5/2000 | Lupi |
| 6,062,127 A | 5/2000 | Klosinski |
| 6,073,302 A | 6/2000 | Buscher |
| 6,075,223 A | 6/2000 | Harrison |
| 6,082,245 A | 7/2000 | Nicolai |
| 6,095,031 A | 8/2000 | Warne |
| 6,109,168 A | 8/2000 | Illy |
| 6,117,471 A | 9/2000 | King |
| 6,142,063 A | 11/2000 | Beaulieu |
| 6,158,328 A | 12/2000 | Cai |
| 6,164,448 A | 12/2000 | Schmutz |
| 6,170,386 B1 | 1/2001 | Paul |
| 6,173,117 B1 | 1/2001 | Clubb |
| 6,178,874 B1 | 1/2001 | Joergensen |
| 6,182,554 B1 | 2/2001 | Beaulieu |
| 6,186,051 B1 | 2/2001 | Aarts |
| D443,792 S | 6/2001 | Peters |
| 6,240,832 B1 | 6/2001 | Schmed |
| 6,240,833 B1 | 6/2001 | Sham |
| 6,245,371 B1 | 6/2001 | Gutwein |
| 6,265,225 B1 | 7/2001 | Otto |
| 6,279,459 B1 | 8/2001 | Mork |
| 6,289,948 B1 | 9/2001 | Jeannin |
| D452,107 S | 12/2001 | Cahen |
| D454,466 S | 3/2002 | Hong |
| 6,360,665 B1 | 3/2002 | Hartmann |
| 6,405,637 B1 | 6/2002 | Cai |
| D459,628 S | 7/2002 | Cahen |
| D460,653 S | 7/2002 | Cahen |
| D461,358 S | 8/2002 | Cahen |
| 6,476,715 B1 | 11/2002 | Bromer |
| 6,499,388 B2 | 12/2002 | Schmed |
| 6,536,332 B2 | 3/2003 | Schmed |
| 6,544,634 B1 | 4/2003 | Abrams |
| D475,567 S | 6/2003 | Hsu |
| 6,606,938 B2 | 8/2003 | Taylor |
| D479,939 S | 9/2003 | Au |
| 6,612,224 B2 | 9/2003 | Mercier |

(56) References Cited

U.S. PATENT DOCUMENTS

| | | |
|---|---|---|
| 6,616,037 B2 | 9/2003 | Grimm |
| 6,644,173 B2 | 11/2003 | Lazaris |
| 6,675,133 B2 | 1/2004 | Knowles |
| 6,698,228 B2 | 3/2004 | Kateman |
| 6,698,332 B2 | 3/2004 | Kollep |
| 6,698,333 B2 | 3/2004 | Halliday |
| D489,930 S | 5/2004 | Tse |
| 6,759,072 B1 | 7/2004 | Gutwein |
| 6,762,851 B1 | 7/2004 | Lynch |
| 6,786,136 B2 | 9/2004 | Charles |
| D497,278 S | 10/2004 | Picozza |
| 6,799,503 B2 | 10/2004 | Kollep |
| 6,857,353 B2 * | 2/2005 | Kollep ............... A47J 31/0668 99/289 R |
| D502,841 S | 3/2005 | Santer |
| 6,892,104 B2 | 5/2005 | Patil |
| 6,920,431 B2 | 7/2005 | Showghi |
| 6,935,222 B2 | 8/2005 | Chen |
| 6,941,855 B2 | 9/2005 | Denisart |
| 6,955,116 B2 | 10/2005 | Hale |
| 6,982,784 B2 | 1/2006 | Matsui |
| 7,024,382 B2 | 4/2006 | Nelson |
| 7,063,238 B2 | 6/2006 | Hale |
| 7,097,074 B2 | 8/2006 | Halliday |
| D530,560 S | 10/2006 | Lin |
| 7,146,034 B2 | 12/2006 | Reeves |
| 7,165,488 B2 | 1/2007 | Bragg |
| 7,197,377 B2 | 3/2007 | Kneeler |
| 7,213,506 B2 | 5/2007 | Halliday |
| 7,219,598 B2 | 5/2007 | Halliday |
| 7,231,869 B2 | 6/2007 | Halliday |
| 7,243,598 B2 | 7/2007 | Halliday |
| 7,255,039 B2 | 8/2007 | Halliday |
| 7,287,461 B2 | 10/2007 | Halliday et al. |
| 7,297,942 B2 | 11/2007 | Holle |
| 7,308,851 B2 | 12/2007 | Halliday |
| 7,316,178 B2 | 1/2008 | Halliday |
| 7,322,277 B2 | 1/2008 | Halliday |
| 7,325,479 B2 | 2/2008 | Laigneau |
| 7,328,651 B2 | 2/2008 | Halliday |
| 7,340,990 B2 | 3/2008 | Halliday |
| 7,418,899 B2 | 9/2008 | Halliday |
| D582,714 S | 12/2008 | Hensel |
| D585,692 S | 2/2009 | Bonin |
| 7,533,603 B2 | 5/2009 | Halliday |
| 7,533,604 B2 | 5/2009 | Halliday |
| 7,534,476 B2 | 5/2009 | Banks |
| 7,561,937 B2 | 7/2009 | Reed |
| 7,613,443 B2 | 11/2009 | Ryu |
| 7,673,558 B2 | 3/2010 | Penesar |
| 7,680,691 B2 | 3/2010 | Kimball |
| 7,797,975 B2 | 9/2010 | Halford |
| 7,822,688 B2 | 10/2010 | Labrou |
| 7,828,020 B2 | 11/2010 | Girard |
| 7,908,031 B2 | 3/2011 | Saether |
| 9,386,877 B2 | 7/2016 | Tanner |
| 2001/0033369 A1 | 10/2001 | Matsui |
| 2001/0041947 A1 | 11/2001 | Patil |
| 2001/0042007 A1 | 11/2001 | Klingle |
| 2002/0002913 A1 | 1/2002 | Mariller |
| 2002/0022523 A1 | 2/2002 | Dan |
| 2002/0023543 A1 | 2/2002 | Schmed |
| 2002/0048621 A1 | 4/2002 | Boyd |
| 2002/0078831 A1 | 6/2002 | Cai |
| 2002/0111877 A1 | 8/2002 | Nelson |
| 2002/0121197 A1 | 9/2002 | Mercier |
| 2002/0121198 A1 | 9/2002 | Kollep |
| 2002/0124736 A1 | 9/2002 | Kollep |
| 2002/0129712 A1 | 9/2002 | Westbrook |
| 2002/0144603 A1 | 10/2002 | Taylor |
| 2002/0144604 A1 | 10/2002 | Winkler |
| 2002/0148356 A1 | 10/2002 | Lazaris |
| 2003/0009312 A1 | 1/2003 | Knowles |
| 2003/0034392 A1 | 2/2003 | Grimm |
| 2003/0050854 A1 | 3/2003 | Showghi |
| 2003/0056655 A1 | 3/2003 | Kollep |
| 2003/0066431 A1 | 4/2003 | Fanzutti |
| 2003/0145736 A1 | 8/2003 | Green |
| 2003/0173717 A1 | 9/2003 | Abrams |
| 2003/0176775 A1 | 9/2003 | Berman |
| 2004/0089158 A1 | 5/2004 | Mahlich |
| 2004/0099731 A1 | 5/2004 | Olenick |
| 2004/0163673 A1 | 8/2004 | Halle |
| 2004/0167664 A1 | 8/2004 | Griffin |
| 2004/0182250 A1 | 9/2004 | Halliday |
| 2004/0191370 A1 * | 9/2004 | Halliday ............. A47J 31/0673 426/112 |
| 2004/0191372 A1 | 9/2004 | Halliday |
| 2004/0197444 A1 | 10/2004 | Halliday |
| 2004/0211322 A1 | 10/2004 | Halliday |
| 2004/0220822 A1 | 11/2004 | Talarico |
| 2004/0228955 A1 | 11/2004 | Denisart |
| 2004/0237793 A1 | 12/2004 | Zurcher |
| 2005/0015348 A1 | 1/2005 | Knepler |
| 2005/0029287 A1 | 2/2005 | Mobbs |
| 2005/0080520 A1 | 4/2005 | Kline |
| 2005/0123186 A1 | 6/2005 | Reeves |
| 2005/0125363 A1 | 6/2005 | Wilson |
| 2005/0187873 A1 | 8/2005 | Labrou |
| 2005/0258961 A1 | 11/2005 | Kimball |
| 2005/0267790 A1 | 12/2005 | Skalsky |
| 2006/0000043 A1 | 1/2006 | Jou-Chen |
| 2006/0016347 A1 | 1/2006 | Girard |
| 2006/0027597 A1 | 2/2006 | Chow |
| 2006/0075026 A1 | 4/2006 | Ryu |
| 2006/0080819 A1 | 4/2006 | McAllister |
| 2006/0107839 A1 | 5/2006 | Nenov |
| 2006/0123998 A1 | 6/2006 | Castellani |
| 2006/0131404 A1 | 6/2006 | Dervishian |
| 2006/0224470 A1 | 10/2006 | Garcia Ruano |
| 2006/0226228 A1 * | 10/2006 | Gagne ............... G06K 7/10702 235/462.01 |
| 2006/0242084 A1 | 10/2006 | Moses |
| 2006/0242875 A1 | 11/2006 | Wilson |
| 2007/0104837 A1 | 5/2007 | Yoakim |
| 2007/0125354 A1 | 6/2007 | Boesch |
| 2007/0157821 A1 | 7/2007 | Panesar |
| 2008/0189078 A1 | 8/2008 | Volt |
| 2008/0229932 A1 | 9/2008 | Magg |
| 2008/0243919 A1 | 10/2008 | Ullmann |
| 2008/0283550 A1 | 11/2008 | Nighy |

FOREIGN PATENT DOCUMENTS

| | | |
|---|---|---|
| EP | 0334571 A1 | 9/1989 |
| EP | 0334572 A1 | 9/1989 |
| EP | 0162417 B1 | 3/1990 |
| EP | 0387541 B1 | 9/1990 |
| EP | 0469162 A1 | 2/1992 |
| EP | 0517835 B1 | 12/1992 |
| EP | 0638486 A1 | 2/1995 |
| EP | 0604615 B1 | 9/1998 |
| EP | 0862882 A1 | 9/1998 |
| EP | 0870457 A1 | 10/1998 |
| EP | 0904718 A1 | 3/1999 |
| EP | 0922797 A2 | 6/1999 |
| EP | 0922797 A3 | 10/1999 |
| EP | 1090574 A1 | 4/2001 |
| EP | 1093842 A1 | 4/2001 |
| EP | 1095605 A1 | 5/2001 |
| EP | 0922797 B1 | 8/2001 |
| EP | 1153561 A1 | 11/2001 |
| EP | 1208782 A1 | 5/2002 |
| EP | 0862882 B1 | 7/2002 |
| EP | 0919171 B1 | 1/2003 |
| EP | 0983878 B1 | 5/2003 |
| EP | 1093842 B1 | 5/2003 |
| EP | 1316283 A2 | 6/2003 |
| EP | 0895744 B1 | 8/2003 |
| EP | 0904719 B1 | 8/2003 |
| EP | 1052030 B1 | 8/2003 |
| EP | 0947336 B1 | 12/2003 |
| EP | 1024096 B1 | 5/2004 |
| EP | 1224635 B1 | 6/2004 |

(56) References Cited

FOREIGN PATENT DOCUMENTS

| | | | |
|---|---|---|---|
| EP | 1593329 | A1 | 11/2005 |
| EP | 1669011 | A1 | 6/2006 |
| EP | 1541070 | B1 | 11/2006 |
| EP | 1772398 | * | 4/2007 |
| EP | 1772398 | A1 | 11/2007 |
| FR | 1537031 | | 8/1968 |
| GB | 468248 | A | 7/1937 |
| GB | 828529 | A | 2/1960 |
| GB | 1215840 | A | 12/1970 |
| GB | 2374795 | A | 10/2002 |
| GB | 2374816 | A | 10/2002 |
| GB | 2374856 | A | 10/2002 |
| GB | 2379624 | A | 3/2003 |
| GB | 2397510 | A | 7/2004 |
| GB | 2409965 | B | 9/2005 |
| JP | 287759 | U | 7/1990 |
| JP | 618259 | U | 3/1994 |
| JP | H08141300 | A | 6/1996 |
| JP | 2000355375 | A | 12/2000 |
| JP | 2006142008 | | 6/2006 |
| KR | 950005670 | B1 | 5/1995 |
| KR | 2004102295 | A | 12/2004 |
| RU | 688175 | A | 9/1979 |
| RU | 2086411 | C1 | 8/1997 |
| RU | 2005126705 | A | 6/2006 |
| RU | 2283016 | C2 | 9/2006 |
| RU | 2286076 | C2 | 10/2006 |
| WO | 9419776 | A1 | 9/1994 |
| WO | 9507648 | A1 | 3/1995 |
| WO | 9516377 | A1 | 6/1995 |
| WO | 9717006 | A1 | 5/1997 |
| WO | 9847418 | A1 | 10/1998 |
| WO | 0042891 | A1 | 7/2000 |
| WO | 0113279 | A2 | 2/2001 |
| WO | 0115582 | A1 | 3/2001 |
| WO | 0219875 | A1 | 3/2002 |
| WO | 02080745 | A1 | 10/2002 |
| WO | 02085170 | A2 | 10/2002 |
| WO | 02087400 | A1 | 11/2002 |
| WO | 02094672 | A1 | 11/2002 |
| WO | 03005295 | A1 | 1/2003 |
| WO | 02085170 | A3 | 3/2003 |
| WO | 03026470 | A2 | 4/2003 |
| WO | 03053200 | A1 | 7/2003 |
| WO | 2003059778 | A3 | 7/2003 |
| WO | 03065859 | A2 | 8/2003 |
| WO | 2003065859 | A3 | 8/2003 |
| WO | 2004097690 | A1 | 11/2004 |
| WO | 03102884 | A1 | 12/2004 |
| WO | 2005079638 | | 9/2005 |
| WO | 2006021039 | A1 | 3/2006 |

OTHER PUBLICATIONS

"More Solutions to Sticky Problems," A Guide to Getting More From Your Brookfield Viscometer, Brookfield Engineering Laboratories, Inc., Stoughton, Massachusetts, date unknown, 28 pages.

"The Helipath Stand," A Brookfield Viscometer Accessory, Brookfield Engineering Laboratories, Inc., Stoughton, Massachusetts, date unknown, 2 pages.

Codex Standard for Evaporated Milks, Codex Stan A-3-1971, Rev. 1-1999, 3 pages.

European Patent Office, Extended European Search Report dated Jun. 24, 2016, from corresponding European Patent Application No. 08755631.2, 5 pages.

Food Composition and Nutrition Tables, Dairy Products, Medpharm Scientific Publishers, Stuttgart, 1994, 5 pages.

Harold McGEE, "On Food and Cooking," The Science and Lore of the Kitchen, Harper Collins Publishers, London, 1991, p. 16.

Literature Search Results, search performed prior to May 17, 2007, 6 paces.

Written Opinion of the International Search Authority dated Aug. 8, 2008 in corresponding International (PCT) Application No. PCT/US2008/063818, 6 pages.

Brazilian Patent Office, Pre-Examination Report dated Sep. 4, 2018, from corresponding Brazilian Patent Application No. PI0811646-6, 2 pages.

\* cited by examiner

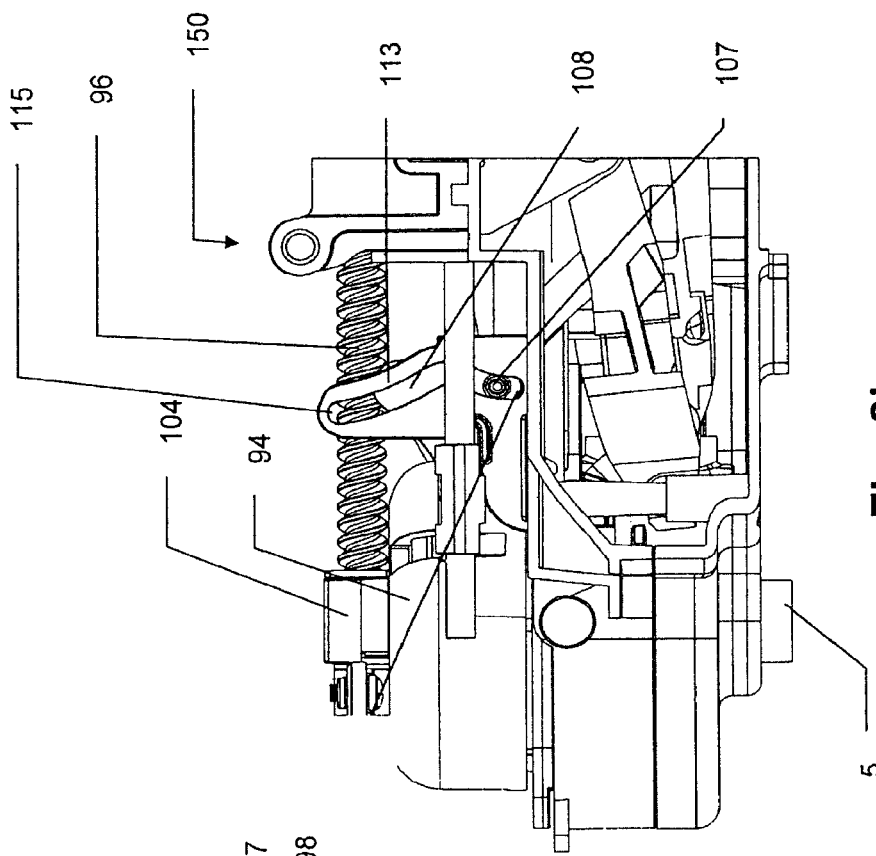
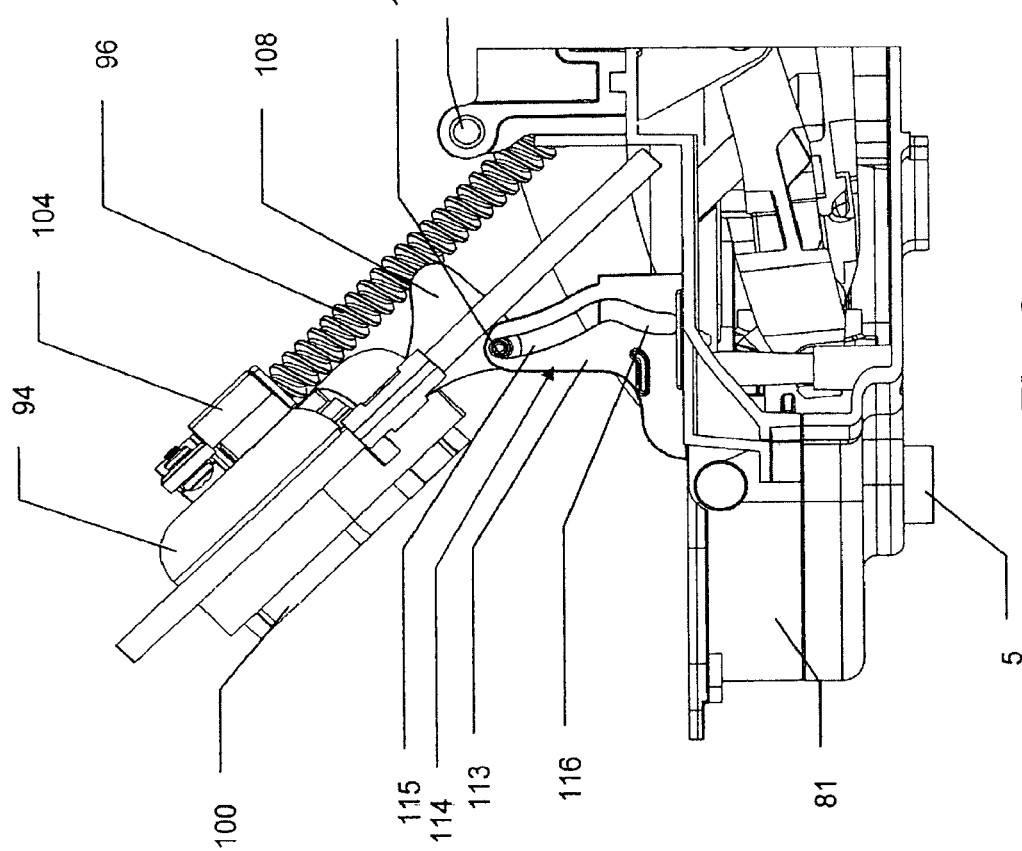

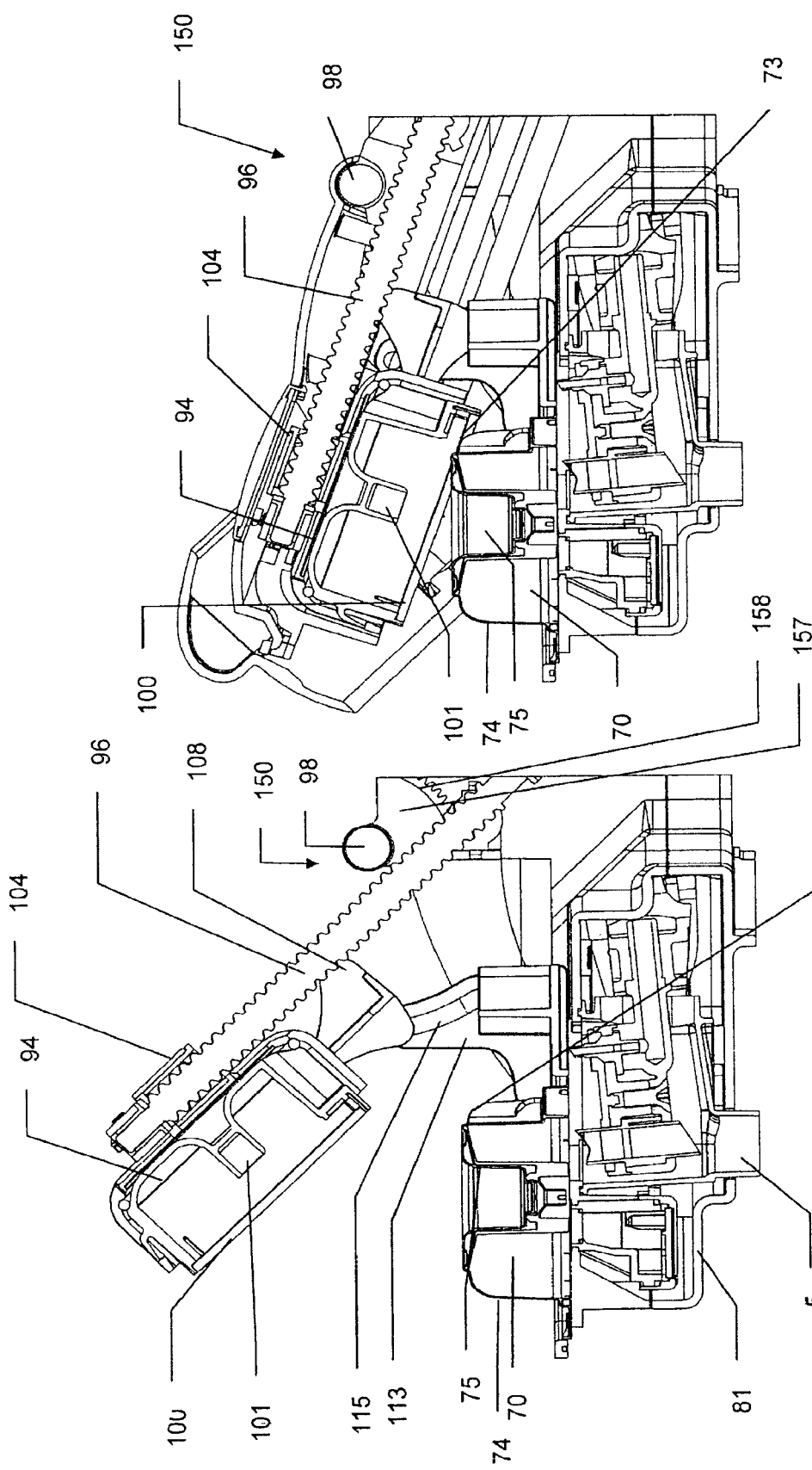

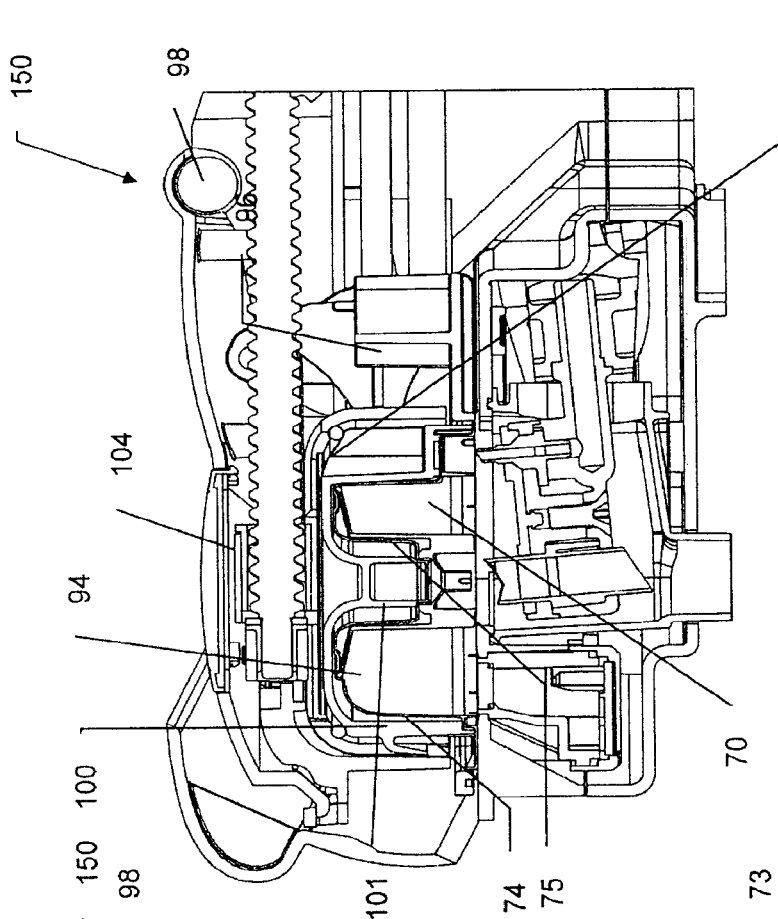
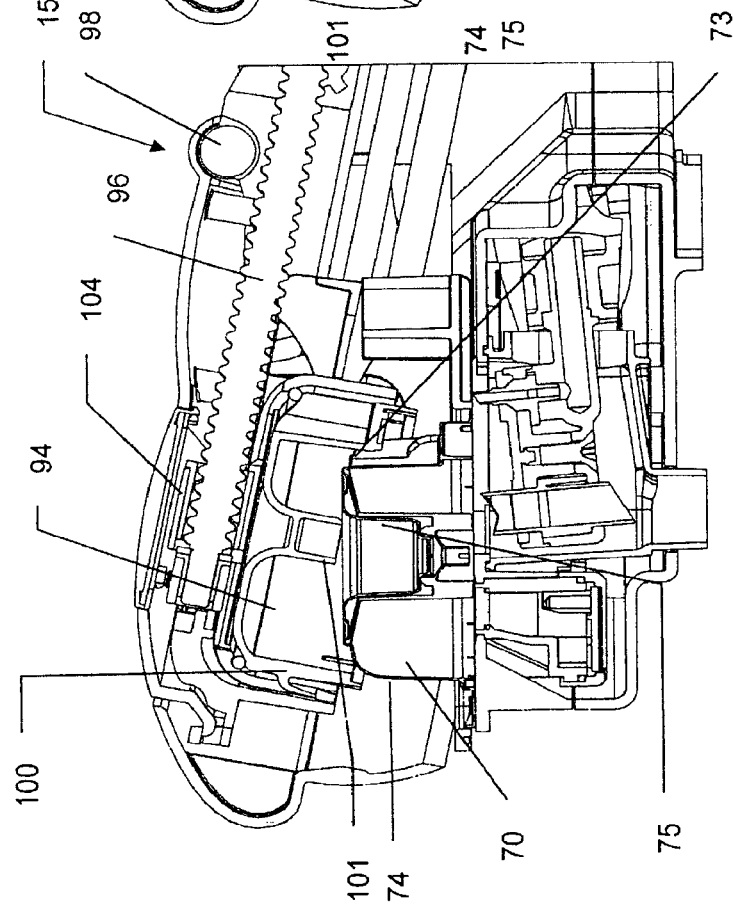
Fig. 9d
Fig. 9c

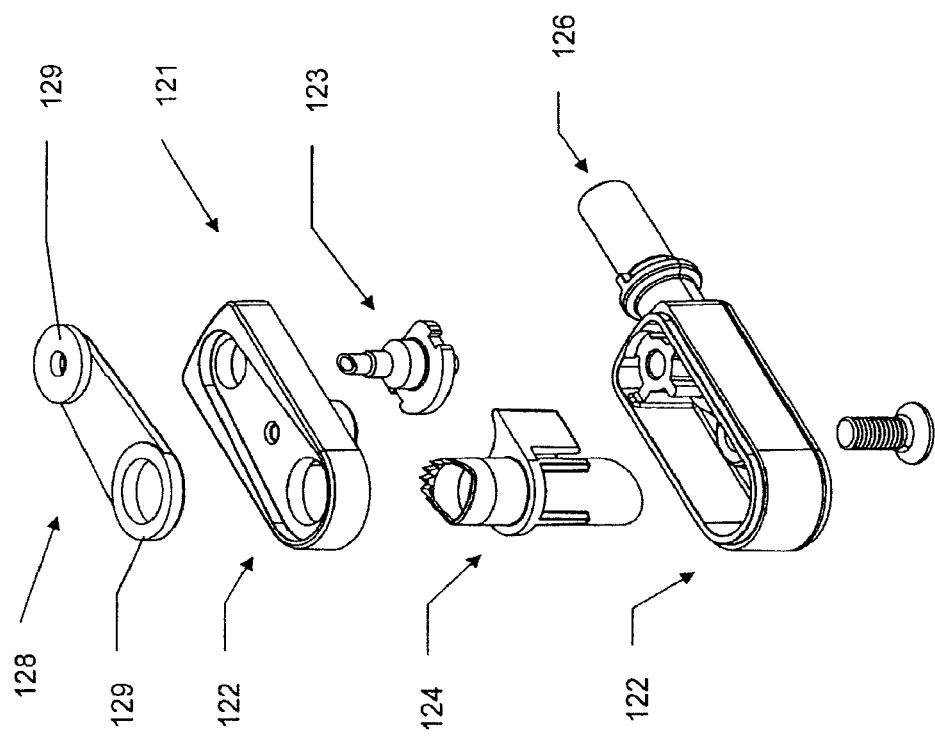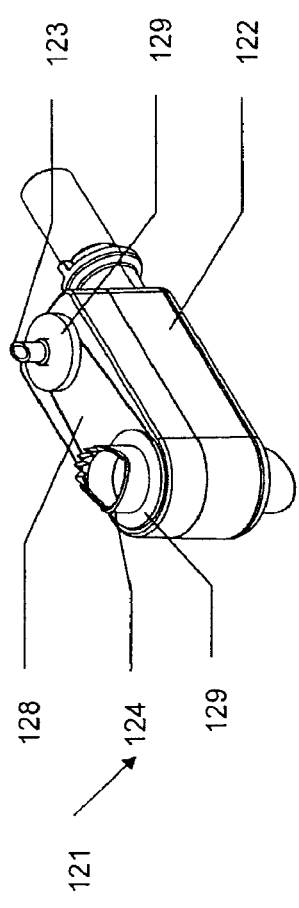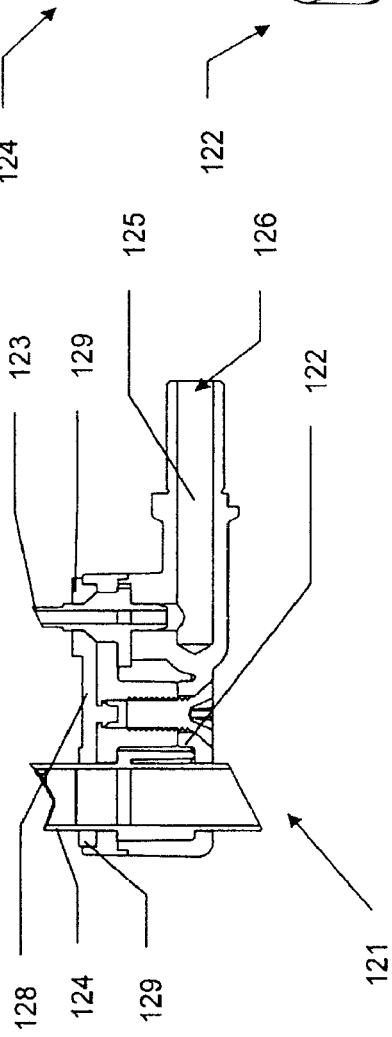
Fig. 12c
Fig. 12a
Fig. 12b

BEVERAGE PREPARATION MACHINES AND BEVERAGE CARTRIDGES

CROSS-REFERENCE TO RELATED APPLICATIONS

This application is a divisional of U.S. patent application Ser. No. 12/600,588, filed on Nov. 17, 2009, which is a U.S. national phase application filed under 35 U.S.C. § 371 of International Application PCT/US2008/063818, filed on May 16, 2008, designating the United States, which claims benefit to U.S. Provisional Patent Application No. 60/940, 118, filed on May 25, 2007, and Great Britain application GB 0709590.4, filed on May 18, 2007, all of which are hereby incorporated by reference herein.

FIELD

The present invention relates to improvements in beverage preparation machines and beverage cartridges and in particular to a delivery head for a beverage preparation machine of the type which use pre-packaged containers of beverage ingredients and the pre-packaged containers used therein.

BACKGROUND

Beverage preparation machines such as coffee or tea brewing machines are well known. It is known to provide beverage preparation machines which dispense individual servings of beverage directly into a receptacle such as a cup. Such machines may derive the beverage from a bulk supply of beverage ingredients or from packages of beverage ingredients such as pods, pads or cartridges. An example of one type of such packages is shown in EP1440903. In the following specification such packages will be referenced by the general term cartridges. However, the invention is not limited to use with one particular type of pod, pad or cartridge. The beverages are formed from brewing, mixing, dissolving or suspending the beverage ingredients in water. For example, for coffee beverages, heated water is passed through the cartridges to form the extracted solution. The use of cartridges in such machines has become increasingly popular due to their convenience and the quality of the beverage produced.

For convenience it is known for such machines to include a mechanism for ejecting the cartridges from the delivery head of the machine after each dispense cycle. Also, for convenience it is known to provide such machines with a reader for detecting barcodes on cartridges in order to identify the type of cartridge or the required dispensing parameters prior to commencing the dispense cycle. However, combining an ejection mechanism with a reader for reading barcodes can cause problems associated with maintaining the cleanliness of the reader and thereby the consistency of operation of the reader.

SUMMARY

It is an object of the present invention to provide a delivery head and beverage preparation machine incorporating an improved ejection mechanism and barcode reader which help to address this problem.

Accordingly, the present invention provides a delivery head for a beverage preparation machine comprising:

an upwardly directed inlet for supplying water to a cartridge received in the delivery head;

a downwardly directed outlet for outflow of beverage;

a barcode reader having a barcode reader window through which signals may be transmitted;

wherein the inlet, the outlet and the barcode reader window are arranged in a line with the outlet being intermediate the inlet and the barcode reader window.

Preferably the delivery head comprises a first part defining a support surface for a cartridge, the inlet, the outlet, and the barcode reader window being located in or on the first part.

Preferably the support surface comprises a horizontal surface.

Preferably the inlet comprises an inlet piercer for forming an inlet opening in a cartridge received in the delivery head.

Preferably the outlet comprises an outlet piercer for forming an outlet opening in a cartridge received in the delivery head.

Preferably the inlet piercer and the outlet piercer are movable between an extended position and a retracted position.

Preferably the delivery head further comprises an ejection chute and the inlet, the outlet, the barcode reader window and the ejection chute are located in a line with the outlet and the inlet being intermediate the barcode reader window and the ejection chute.

Preferably the barcode reader window is located to a front of the delivery head and the ejection chute is located to a rear of the delivery head.

Preferably a centroid of the inlet, a centroid of the outlet and a centroid of the barcode reader window lie on a straight line.

The barcode reader window may comprise a rectangular window, wherein a longer edge of the rectangular window is arranged perpendicularly to a line joining the inlet, the outlet and the barcode reader window.

Preferably the delivery head further comprises a clamping member which is movable relative to a first part from an open position to a clamping position and to an ejection position;

in the open position the clamping member being positioned to enable loading of a cartridge into the delivery head;

in the clamping position the clamping member being clampable against said cartridge;

in the ejection position the clamping member being positioned to enable ejection of said cartridge;

the clamping member being movable in a direction substantially parallel to the first part from the clamping position to the ejection position wherein movement of the clamping member towards the ejection position is such that an inlet and an outlet of the cartridge are moved away from, and do not pass over, or in the vicinity of, the barcode reader window of the delivery head.

The present invention also provides a beverage preparation machine comprising a delivery head as described above.

Further, the present invention provides a beverage preparation system comprising a beverage preparation machine as described above and one or more cartridges, wherein the one or more cartridges contain one or more beverage ingredients.

The present invention also provides a cartridge for use in a beverage preparation machine of a type comprising:

a delivery head;

an upwardly directed inlet for supplying water to the cartridge received in the delivery head;

a downwardly directed outlet for outflow of beverage; and a barcode reader having a barcode reader window through which signals may be transmitted;

the cartridge comprising, or being adapted to contain in use, a quantity of one or more beverage ingredients, a lower surface of the cartridge comprising an inlet and an outlet arranged to communicate respectively with the inlet and outlet of the delivery head of the beverage preparation machine when the cartridge is inserted into the machine such that, in use, water from the inlet of the delivery head passes upwardly through the inlet of the cartridge and such that beverage produced from the water and the one or more beverage ingredients passes downwardly through the outlet of the cartridge to flow out of the outlet of the delivery head, the lower surface of the cartridge further comprising a barcode which, in use, is readable by the barcode reader of the beverage preparation machine for controlling operation of the beverage preparation machine, characterised in that the barcode, the inlet and the outlet of the cartridge are located in a line with the outlet being intermediate the inlet and the barcode.

Preferably the outlet is located at a centre or near a centre of the lower surface of the cartridge.

Preferably the inlet and the outlet of the cartridge are initially closed by one or more frangible membranes.

Preferably a centroid of the inlet, a centroid of the outlet and a centroid of the barcode lie on a straight line.

The barcode may comprise a rectangular arrangement of coding lines, wherein a longer edge of the rectangular arrangement is arranged perpendicularly to a line joining the inlet, the outlet and the barcode.

The present invention also provides a method of dispensing a beverage from a cartridge using a beverage preparation machine, the beverage preparation machine being of the type having a delivery head comprising: an inlet for supplying water to the cartridge, an outlet for beverage, a barcode reader having a barcode reader window, an ejection chute, and a clamping member; the barcode reader window and the ejection chute being located in a line with the inlet and the outlet, and the inlet and the outlet being intermediate the barcode reader window and the ejection chute;

the cartridge being of the type comprising an inlet, an outlet and a barcode; the inlet, the outlet and the barcode being located in a line with the outlet intermediate the inlet and the barcode;

wherein the method comprises the steps of:

moving the clamping member into an open position;

inserting the cartridge into the delivery head;

moving the clamping member into a closed position such that the inlet, the outlet and the barcode of the cartridge are aligned respectively with the inlet, the outlet and the barcode reader window of the delivery head;

pumping water through the inlet of the delivery head and the inlet of the cartridge so as to form a beverage from the one or more beverage ingredients of the cartridge;

delivering said beverage out of the outlet of the insert and the outlet of the delivery head;

moving the clamping member from the closed position to the ejection position to move the cartridge into alignment with the ejection chute to achieve ejection of the cartridge from the delivery head;

wherein movement of the cartridge towards the ejection chute is such that the inlet and the outlet of the cartridge move away from, and do not pass over, or in the vicinity of, the barcode reader window of the delivery head.

Advantageously, with the barcode reader system and ejection system of the present invention the direction of movement of the cartridge on ejection is towards a rear of the delivery head away from the barcode window. This helps to prevent soiling of the barcode window by preventing the now open inlet and outlet of the cartridge passing over or in the vicinity of the window.

BRIEF DESCRIPTION OF THE DRAWINGS

An embodiment of the present invention will now be described, by way of example only, with reference to the accompanying drawings in which:

FIGS. 8a and 8b are elevational views of the delivery head of FIG. 3 with some parts shown in section and some parts omitted for clarity illustrating movement of a cartridge guide of the delivery head;

FIGS. 9a to 9d are cross-sectional views of the delivery head of FIGS. 8a and 8b with some parts sectioned and with a second cartridge inserted, illustrating movement of the cartridge guide on closure of the delivery head;

FIGS. 12a to 12c illustrate a piercer unit of the delivery head of FIG. 3; and

DETAILED DESCRIPTION

Figure 2:
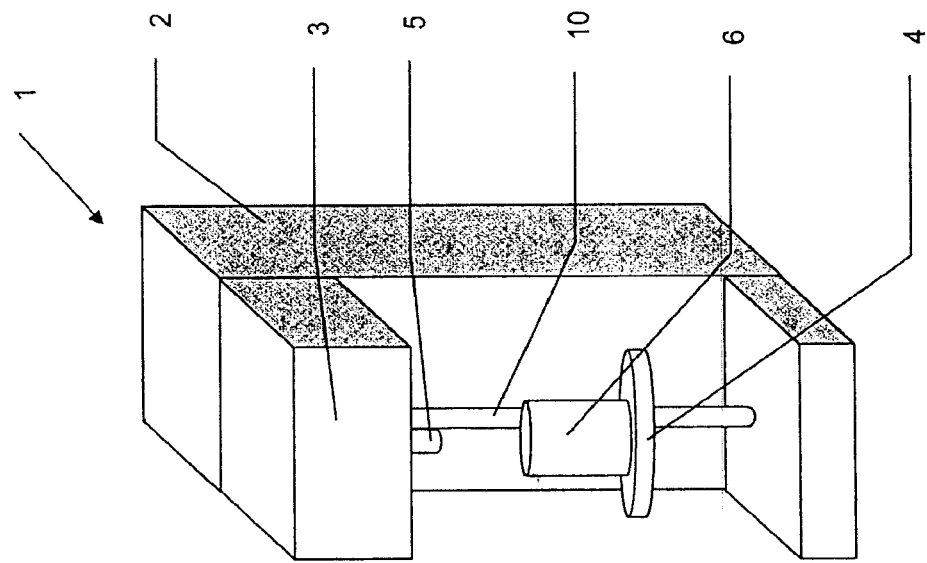
FIG. 2 is a perspective view of a second version of beverage preparation machine according to the present invention which includes a single delivery head.
Figure 1:
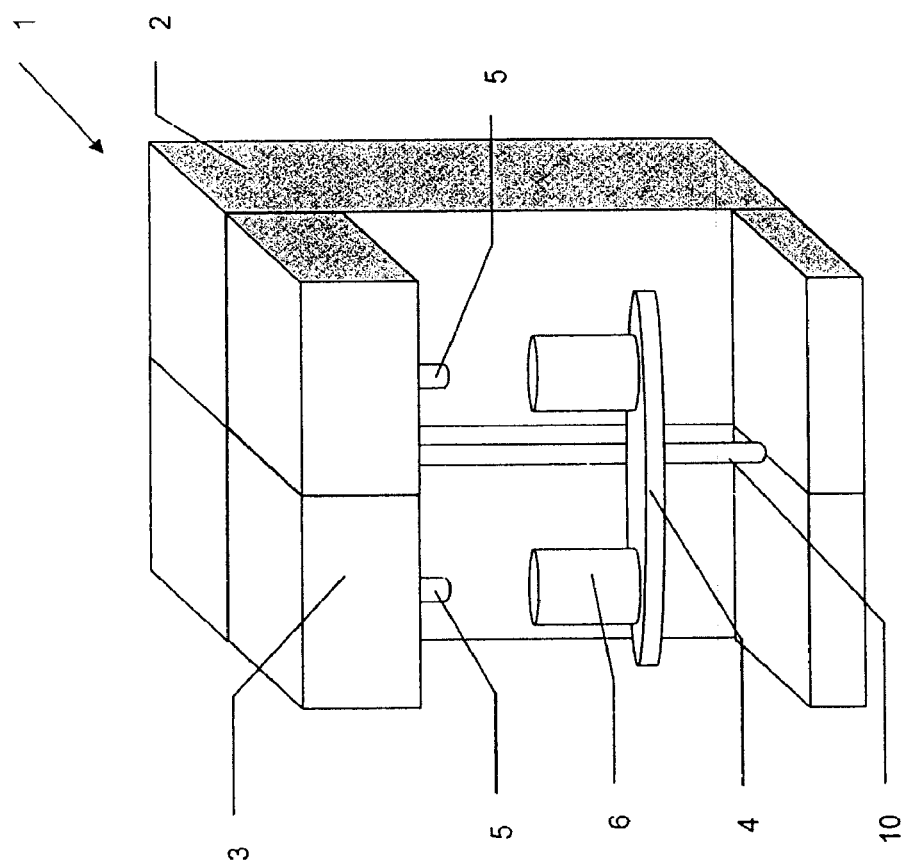
FIG. 1 is perspective view of a first version of beverage preparation machine according to the present invention which includes first and second delivery heads.

The beverage preparation machines 1 of FIGS. 1 and 2 each comprise a housing 2 containing the internal mechanisms of the machine such as a water reservoir, a pump, heating means and control means.

The machine 1 of FIG. 2 comprises a single brewer. The machine 1 of FIG. 1 comprises a first brewer and a second brewer coupled together.

Each brewer of the machines 1 comprises a delivery head 3 provided towards an upper part of the housing 2 in which, in use, is received a cartridge containing one or more beverage ingredients. The delivery head or heads 3 are connected with a chassis of the machine 1 on assembly. The delivery heads 3 are preferably identical. Beverage is dispensed from the brewer through an outlet spout 5 by pumping water from the reservoir of the brewer through the cartridge to form the beverage which is then directed through the outlet spout 5 into a cup 6. As can be seen in FIG. 1, two outlet spouts 5 are provided for a machine with two brewers.

Figure 3:
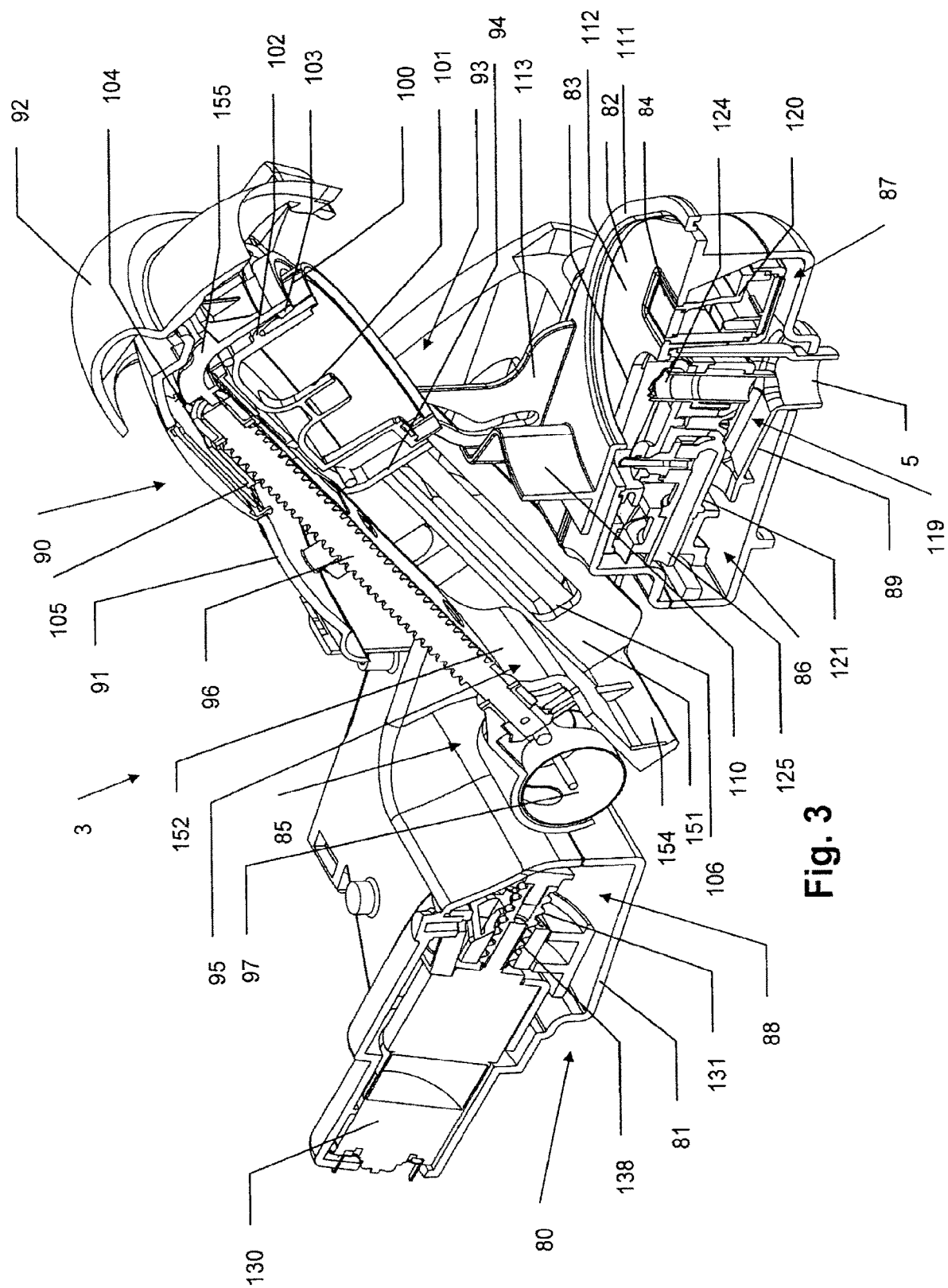
FIG. 3 is a cross-sectioned perspective view of a delivery head according to the present invention in an open position.

As shown in FIG. 3, the delivery head 3 comprises a lower part 80, an upper mechanism 90 and a cartridge guide 110. Some parts of the outer cowling of the delivery head have been omitted for clarity. In practice the outer cowling will comprise a number of mouldings shaped to contain and protect the internal components of the delivery head.

The lower part 80 comprises a housing 81 formed from upper and lower mouldings. The housing 81 defines a motor cavity 88 towards a rear of the delivery head 3, a piercer unit cavity 86 towards a front of the delivery head 3 and a barcode reader cavity 87 at a foremost portion of the delivery head 3. A forward part of the upper surface of the housing 81 is provided with a flattened support surface 82 in which is located a piercer unit aperture 83 and a barcode window 84. Rearward of the support surface 82 the upper moulding is shaped to define an ejection chute 85 that is open to below the delivery head 3.

Figure 13:
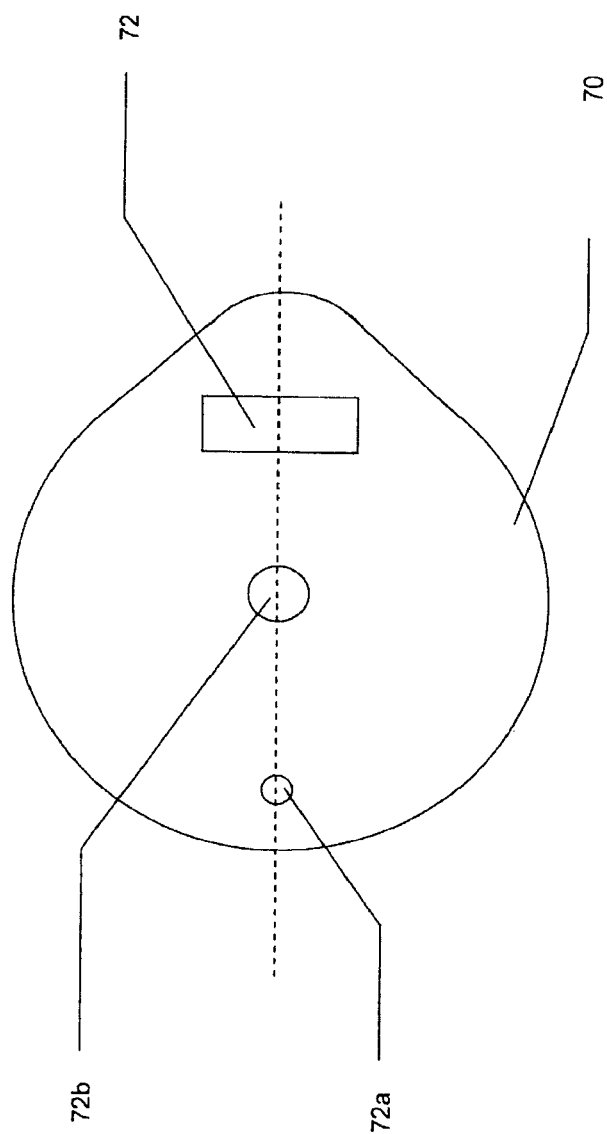
FIG. 13 is a plan view of a beverage cartridge of the present invention comprising a barcode

The barcode window 84 is rectangular in shape to match the shape of a barcode applied or printed on the cartridges 70 to be used in the delivery head 3. The barcode window 84 and piercer unit aperture 83 are arranged on a midline of the delivery head 3 with the longer edge of the barcode window 84 arranged perpendicularly to the midline of the delivery head 3. As shown in FIG. 13 the barcode 72 of cartridge 70 and the location of the inlet 72a and outlet 72b of the cartridge (which are both opened by the piercing mechanism) are likewise in a straight line.

The upper mechanism 90 comprises a carriage frame 95, a handle 92, a clamping mechanism 93, a lead screw 96, and a motor 97.

The carriage frame 95 forms the core of the upper mechanism and provides a structural framework for the other components of the upper mechanism. The carriage frame 95 comprises an elongate frame extending from a front end 155 to a rear end 154 as shown in FIG. 3. The frame comprises two side members 151 and an upper member 152 joining the two side members 151. The upper member 152 is provided with two upstanding webs 156 as most clearly shown in FIG. 9b. Each side member 151 comprises an elongate side slot 106 and the upper member 152 comprises an elongate upper slot 153 as most clearly shown in FIG. 5. The carriage frame 95 is preferably formed from a single moulding and is symmetric about a midline of the delivery head 3.

The carriage frame 95 is pivoted to the lower part 80 by a pair of hinges 98 formed on the upstanding webs 156 at pivot points 150 as most clearly seen in FIGS. 9b to 9d. The hinges 98 are offset from the upper surface of the lower part 80 and positioned above the level of the support surface 82. As most clearly shown in FIG. 9a by omission of certain parts of the housing 91, the hinges 98 may comprise a cog 157 having teeth 158 which engage with a damping member during pivoting of the carriage frame 95 to thereby provide control over the pivoting speed of the carriage frame 95. For example, the damping member may act to ensure that if the handle 92 of the delivery head 3 is released when the carriage frame 95 is in the raised position then the carriage frame 95 pivots downwardly in a controlled manner rather than free-falling into contact with the lower part 80. The damping member may comprise a cog suitable for engaging the cog 157 and a damper, such as a rotatable vane, movable within a viscous damping fluid such as oil.

The handle 92 is connected to the carriage frame 95 and extends around a front of the delivery head 3. The handle 92 is pivotably connected to the carriage frame 95 by a mechanism such that with the carriage frame 95 in a lowered position the handle 92 can be depressed to engage hooks provided on the handle 92 with bosses provided on the lower part 80 in order to securely hold the carriage frame in the lowered position. An example of such a mechanism is described in EP1440644. However, such a mechanism is not relevant to the present invention. The clamping mechanism 93 comprises a cup-shaped clamp member 100 and a cup-shaped socket 94. The clamp member 100 is provided with a central spigot 101. A plurality of flexible protrusions 102 are provided on an exterior of the clamp member 101 which engage with an inwardly-directed flange 103 of the socket 94 so as to retain the clamp member 100 fixedly within the socket 94 on assembly. The socket 94 is provided on an upper surface with a cylindrical member 104 in which is seated a threaded nut 105. The threaded nut 105 is engaged on the lead screw 96. The socket 94 of the clamping mechanism 93 is also provided with a pair of bosses or similar which are engaged in, and slidable along the side slots 106 of the carriage frame 95 so as to maintain correct orientation of the socket 94 on operation of the lead screw 96. Consequently, rotation of the lead screw 96 can be used to move the socket 94, and hence the clamp member 100 reciprocally along the longitudinal axis of the upper mechanism 90 from the front end 155 to the rear end 154 of the carriage frame 95 as will be described below when the operation of the delivery head 3 is discussed. As best shown in FIGS. 8a and 8b the socket 94 further comprises a pair of tail pieces 108 which extend rearwardly from either side of the cup-shaped body of the socket 94. The tail pieces 108 are each provided with a pin 107 at or near a distal end thereof, the use of which will be described below.

Figure 5:
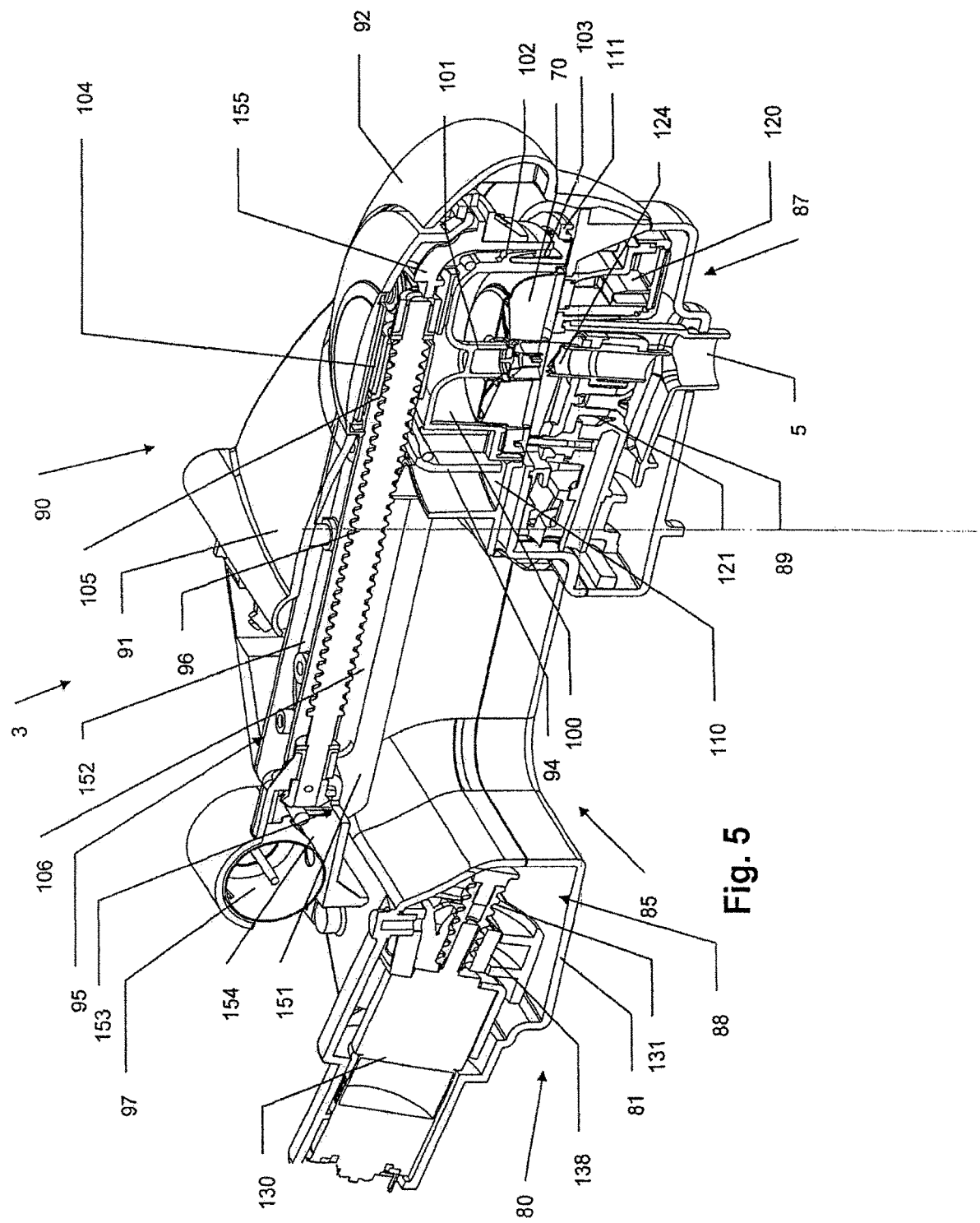
FIG. 5 is a cross-sectioned perspective view of the delivery head of FIG. 3 in a closed position with the cartridge in a dispensing position.

The lead screw 96 is mounted to the carriage frame 95. The lead screw 96 is located towards a top of the carriage frame 95 in the opening provided by the upper slot 153 as shown in FIG. 5. Thus, the lead screw 96 extends above the socket 94 and extends along the longitudinal axis of the upper mechanism 90 from the rear end 154 to the front end 155 of the carriage frame 95. The motor 97 is operatively connected to a rear end of the lead screw 96 and is able to rotate the lead screw 96 both clockwise and counter-clockwise. As shown, the motor 97 is mounted to the carriage frame 95 and transverse the longitudinal axis of the upper mechanism 90 to save space and is connected to the lead screw 96 by means of a suitable gear arrangement such as bevel gears.

The cartridge guide 110 is located inbetween the lower part 80 and the upper mechanism 90. The cartridge guide 110 rests on and is slidable relative to the lower part 80 whilst being operatively interconnected with the upper mechanism 90 as described below.

Figure 4:
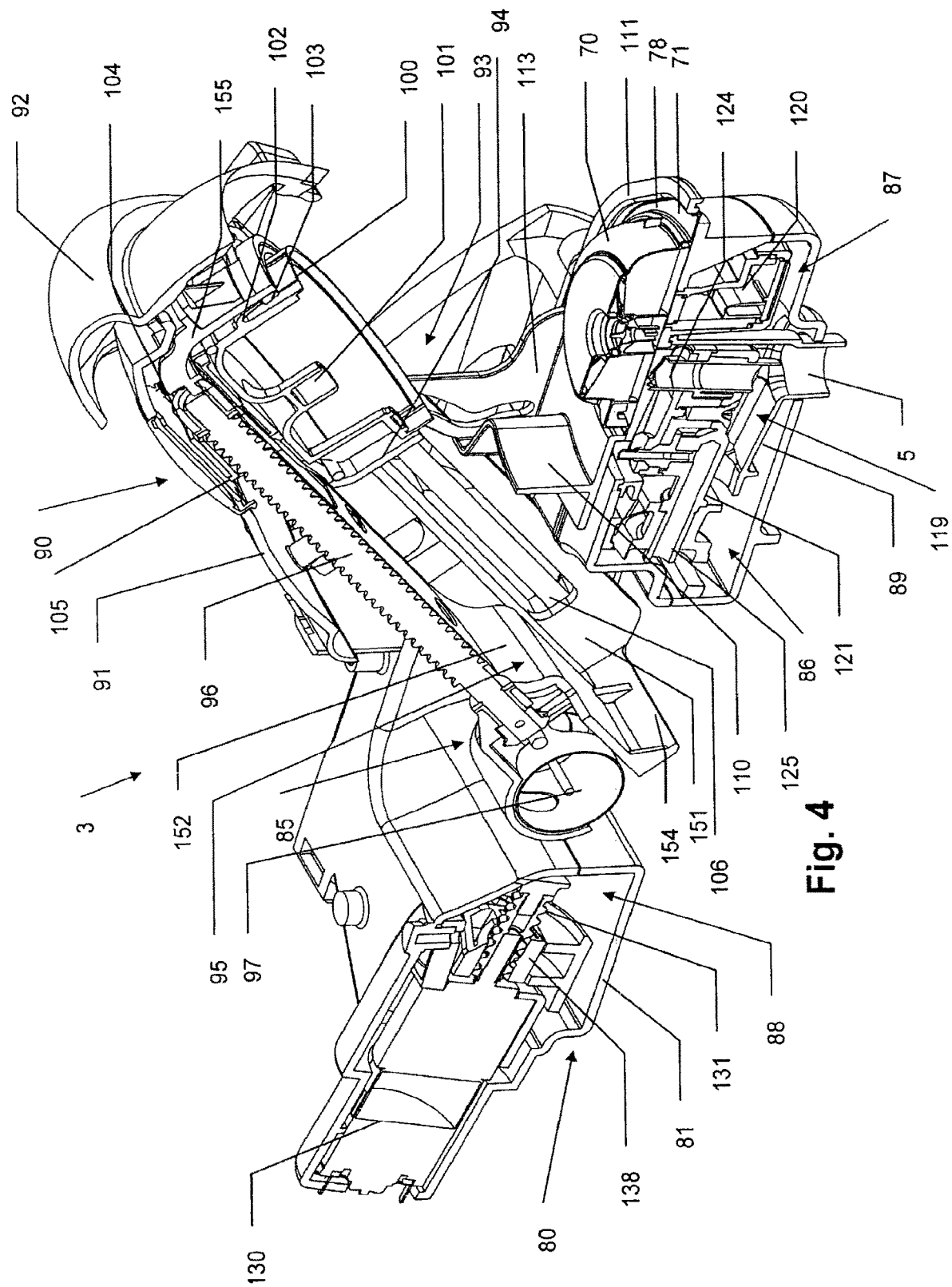
FIG. 4 is a cross-sectioned perspective view of the delivery head of FIG. 3 in the open position and with a first cartridge inserted.

The cartridge guide 110 comprises an annular member 111 and two vertically extending webs 113. The annular member 111 and webs 113 are formed as a single moulding from, for example, a plastics material. The annular member 111 comprises a ring defining an aperture 112 shaped to receive a cartridge 70. The lower face of the cartridge guide 110 rests on the support surface 82. Whilst the aperture 112 closely conforms to the shape of the cartridge 70 in order to enable precise orientation and placement of the cartridge, it is slightly larger than the cartridge 70 such that a cartridge 70 placed within the aperture 112 rests on the support surface 82 of the lower part 80 rather than on the cartridge guide 110 itself. The aperture 112 is shaped also to accommodate a handle portion 71 of the cartridge 70 as shown in FIG. 4. The handle 71 is thereby orientated to a front of the delivery head 3 and positioned symmetrically on the midline of the delivery head 3.

The webs 113 are located on each side of the cartridge guide 110 and, as best shown in FIGS. 8a and 8b, are each provided with a slot 114 of arcuate form in which, on assembly, the pins 107 of the socket 94 are slidingly received. Thus, the cartridge guide 110 and the clamping mechanism are interconnected. Each slot 114 comprises a first portion 115 in the shape of an arc having a centre of rotation coincident with the pivot point 150 of the clamping mechanism 93. Each slot 114 also comprises a second portion 116 in the shape of an arc whose instantaneous centre of curvature is not co-incident with the pivot point 150. The function of the slot 114 will be described below.

The delivery head 3 further comprises a barcode reader 120 and a piercing mechanism 119.

The barcode reader 120 is located in the barcode reader cavity 87 and is orientated to be able to transmit and receive signals through the barcode window 84. Due to the transverse orientation of the barcode window 84 and the barcode reader 120 it can be seen that the barcode reader 120 reads the barcodes of the cartridge 70 by sweeping a beam of light in a direction transversely across the delivery head.

The piercing mechanism 119 comprises a piercer unit 121, a motor 130, a lead screw 131 and a linkage mechanism 133. The piercing mechanism 119 is operative to raise and lower the piercer unit 121. The piercer unit 121 is located in the piercer unit cavity 86 of the lower part 80.

As shown in FIGS. 12a to 12c the piercer unit 121 comprises a body 122 having mounted therein an inlet piercer 123 and an outlet piercer 124. The body 122 is provided with a conduit 125 linking the inlet piercer 123 with a fluid inlet 126 of the body 122. The fluid inlet 126 is coupled by pipework to a supply of water on assembly of the delivery head with the remainder of the machine 1. A seal member 128 is located on an upper face of the body 122 surrounding the inlet piercer 123 and the outlet piercer 124. The seal member 128 is provided with raised annular portions 129 surrounding the piercing element of the inlet piercer 123 and the piercing element of the outlet piercer 124.

The piercer unit cavity 86 is also provided with a spout chute 89 as shown in FIG. 3 into which the piercer unit 121 extends. The spout chute 89 acts as a funnel to channel beverage discharged through the outlet piercer 124 to the outlet spout 5 located at a bottom of the spout chute 89.

The motor 130 is located at a rear of the delivery head 3 remote from the piercer unit 121. The motor 130 is orientated generally in line with a longitudinal axis of the lower part 80 but is angled downwardly slightly below the horizontal. The motor 130 is coupled to the lead screw 131 by means of a threaded, generally U-shaped, rear coupling member 138 as most clearly seen in FIG. 10. A distal end of the lead screw 131 is provided with an end stop. The motor 130 is able to rotate the lead screw 131 both clockwise and counter-clockwise in order to move the rear coupling member 138 reciprocally forwards and backwards relative to the lower part 80.

Figure 10:
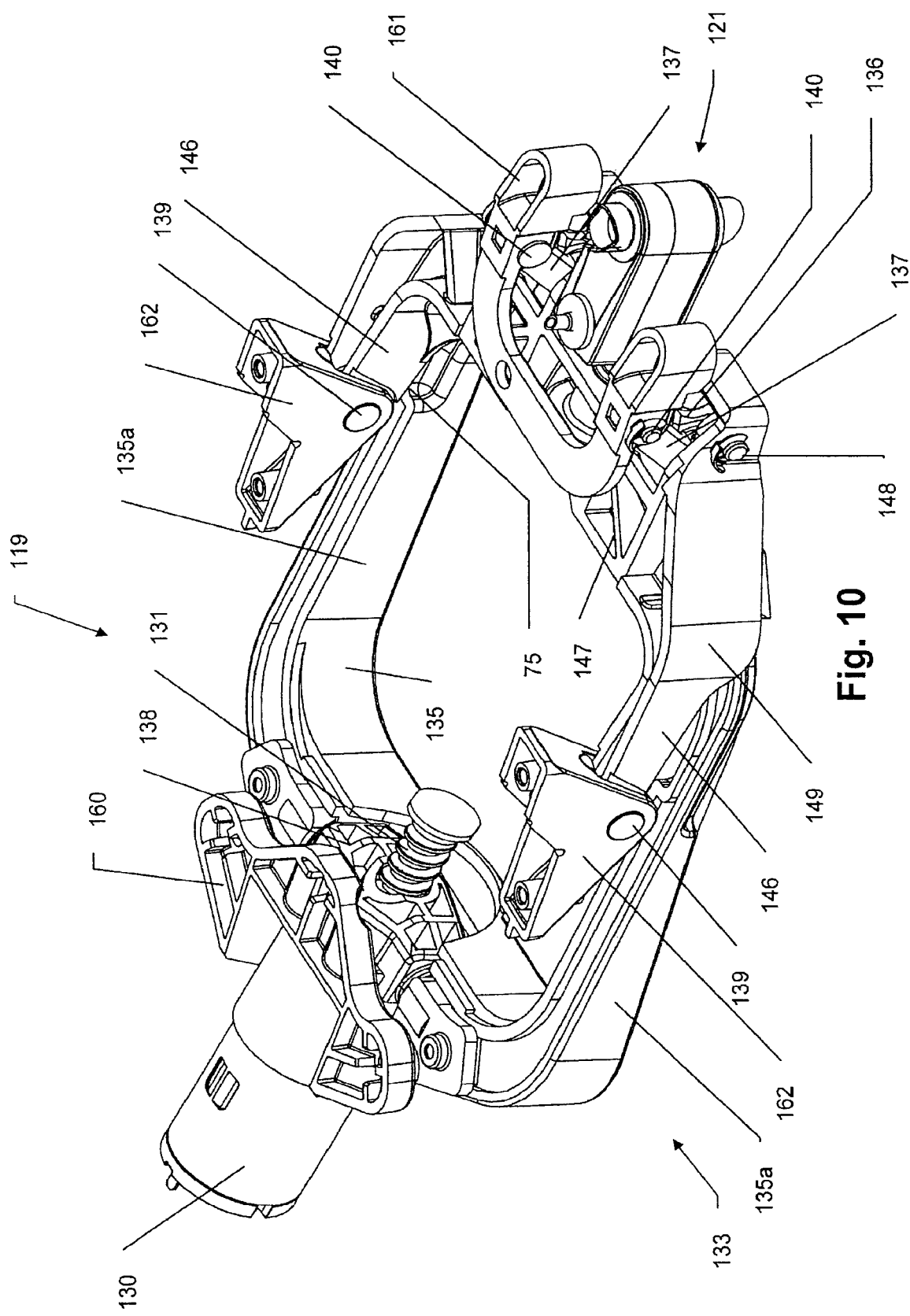
FIG. 10 is a perspective view of a piercing mechanism of the delivery head of FIG. 3.

As shown in FIG. 10, the linkage mechanism 133 comprises a U-shaped primary link 135 having a pair of forward-extending arms 135a, a pair of secondary links 136, a pair of tertiary links 137, the rear coupling member 138 and a forward coupling member 149. The linkage mechanism is mounted to the lower part 80 by means of a rear mounting plate 160, a front mounting plate 161 and two side mounting plates 162 which are all securely mounted to an underside of the upper moulding of the lower part 80.

A pair of first pivot points 139 are provided by the side mounting plates 162. A pair of second pivot points 140 are provided by the front mounting plate 161.

Figure 11A:
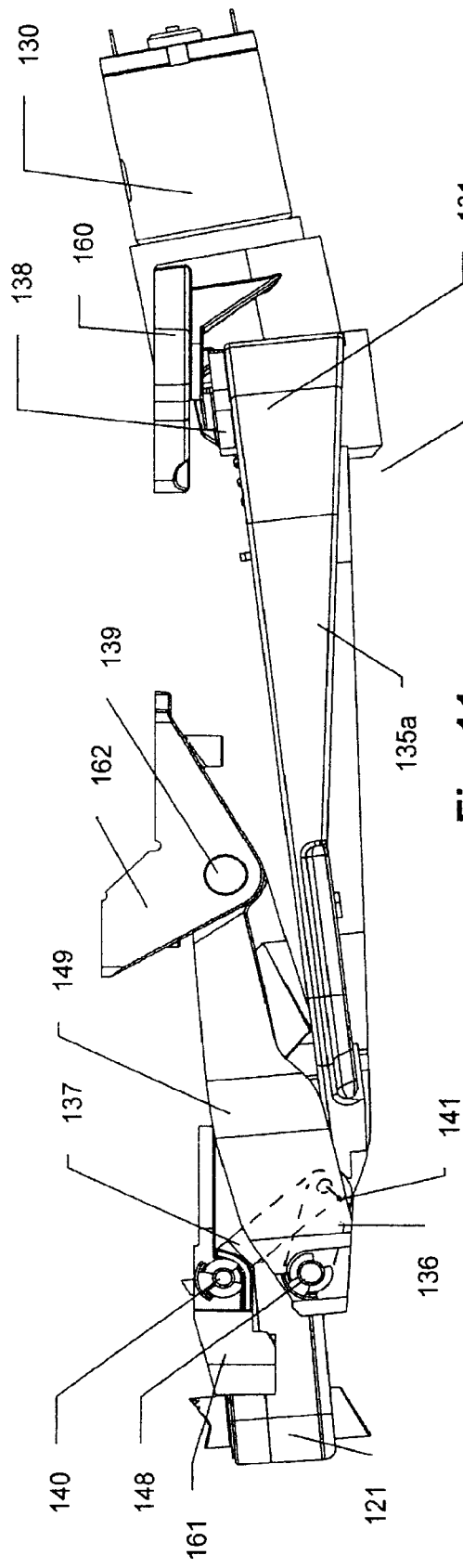
FIGS. 11a and 11b illustrate operation of the piercing mechanism of FIG. 10.
Figure 11B:
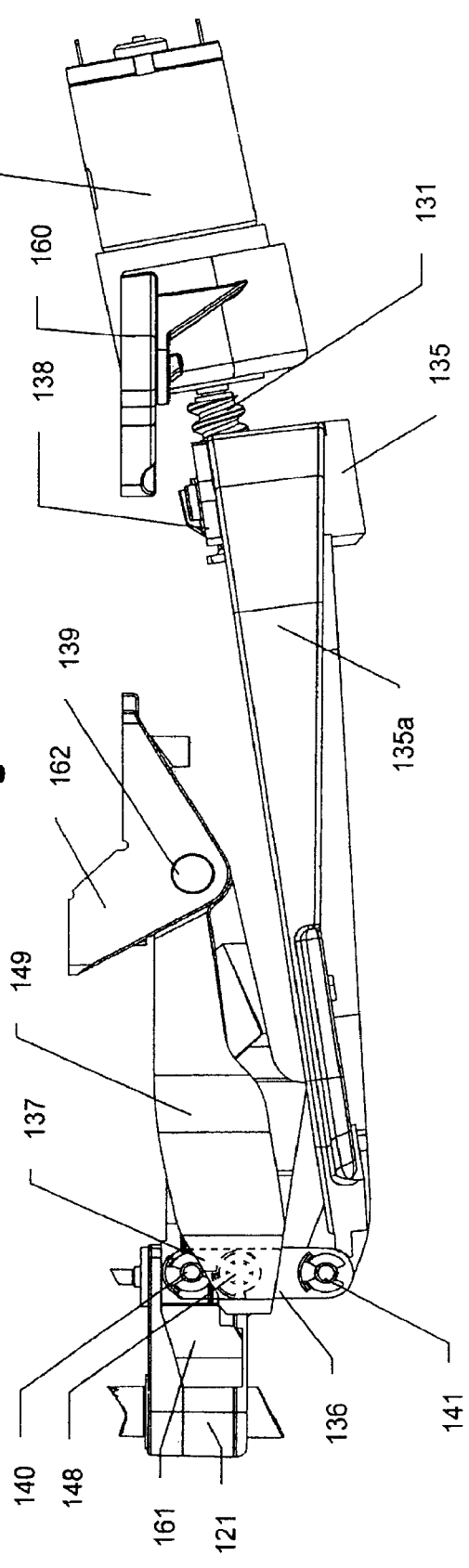

As most clearly shown in FIGS. 10, 11a and 11b, the U-shaped primary link 135 is rotatably coupled at a rear end to the rear coupling member 138.

The forward coupling member 149 comprises a generally U-shaped member having two arms 146 and an interconnecting bridge 147. The distal ends of the arms 146 are rotatably coupled to the first pivot points 139.

The secondary links 136 are rotatably connected to the primary link arms 135a at third pivot points 141 such that a forward end of each primary link arm 135a is connected to a rear end of the respective secondary link 136. The opposite end of each secondary link 136 is rotatably coupled to the forward coupling member 149 at fourth pivot points 148.

The tertiary links 137 are connected between the third pivot points 141 (where the primary link arms 135a and secondary links 136 are coupled) and the second pivot points 140 on the front mounting plate 161.

The piercing unit 121 is rigidly mounted to the interconnecting bridge 147 of forward coupling member 149 as shown in FIG. 10 Alternatively the piercer unit 121 could be formed as one piece with the front coupling member 149.

As most clearly shown in FIG. 10, the linkage mechanism 133 transfers motive force from the motor 130 at the rear of the delivery head 3 to a front of the delivery head 3. In addition, by using pairs of primary link arms 135a, secondary links 136 and tertiary links 137 as well as U-shaped members 135, 149 the linkage mechanism extends around the ejection chute 85 without impeding the chute as shown in FIG. 5.

Operation of the piercing mechanism 119 will be described below.

The beverage preparation machine also comprises a controller for controlling operation of the machine including operation of components of each delivery head 3 such as the motors 95, 130, and the barcode reader 120.

The delivery head 3 may also be provided with interlock or sensing devices linked to the controller to provide data to the controller on the position of the socket 94 on its lead screw 96, the position of the piercing mechanism 119 and the position of the upper mechanism 90, for example whether the upper mechanism 90 is in the closed position Typically an interlock is provided to confirm closure of the handle 92 when the upper mechanism 90 is in the lowered position. Operation of the delivery head 3 is prevented when this interlock indicates that the handle 92 is opened.

As an alternative to providing an interlock on the lead screw 96 to indicate the position of the socket 94 current sensing control may be used. In current sensing the current drawn by the motor 97 is monitored and the controller interprets an increase in the drawn current above a pre-set threshold to be indicative of the socket 94 having reached one of its end stops at either the front end 155 or rear end 154 of the carriage frame 95.

In use, the delivery head 3 is first opened to allow insertion of a cartridge 70 of the type having a bowl-shaped upper portion 76 sealed by a flexible lower membrane 77 around a peripheral flange 78 by moving the upper mechanism 90 into the raised position as shown in FIG. 3. Opening of the upper mechanism is achieved by first opening the handle 92 to disengage the hooks from the bosses of the lower part 80 and then lifting the handle 92. As shown in FIG. 3 and in FIG. 9a, in the raised position of the upper mechanism 90, the cartridge guide 110 is positioned in a forward-most position to ease loading of the cartridge 70 and the clamping member 100 is raised as part of the upper mechanism 90. The cartridge guide 110 is thus positioned because of the interaction of the pins 107 of the tail pieces 108 in the slots 114 of the cartridge guide 110. In particular in the raised position each pin 107 is moved to a top of the first portion 115 of the slot 114 as shown in FIG. 9a.

The cartridge 70 is then inserted into the aperture 112 of the cartridge guide 110 such that the cartridge 70 rests on the support surface 82 as shown in FIG. 4. In FIG. 4 the delivery head 3 is shown with a cartridge 70 having a relatively shallow profile. The handle portion 71 of the cartridge 70 is aligned towards a front of the delivery head 3 and lies on the midline of the delivery head 3.

The upper mechanism 90 is then closed into the position shown in FIG. 5 by pressing down on the handle 92. Closure of the upper mechanism 90 causes the cartridge guide 110 and the cartridge 70 to slide rearwardly over the support surface 82 into a dispensing position wherein the cartridge 70 is correctly aligned with the piercer aperture 83 and the barcode window 84. The rearward movement of the cartridge guide 110 is caused by the interaction of the pins 107 and slots 114. As shown in FIG. 8a, 8b and FIGS. 9a to 9d downward rotation of the upper mechanism 90 causes the clamping mechanism 93 also to rotate downwardly moving the pins 107 first along the first portion 115 of the slots 114 and then along the second portion 116. Movement of the pins 107 along the first portion 115 of the slots to the position shown in FIG. 9c does not cause any movement of the cartridge guide 110 since the centre of curvature of the first portion 115 is coincident with the point of rotation of the clamping mechanism 93. However, further downward rotation of the clamping mechanism 93 does cause rearward sliding of the cartridge guide 110 due to the pins 107 bearing against a rearmost face of the slots 114 to thereby force the cartridge guide 110 to move to accommodate the pin's movement into the position shown in FIG. 9d. In the closed position of the clamping mechanism 93 the cartridge guide 110 has moved in a rearward direction by between 7.8 and 10 mm.

In the closed position the spigot 101 of the clamping member 100 is engaged in a relatively shallow central well 75 formed in the upper portion 76 of the cartridge 70. The clamping member 100 is also provided with a formation 79 aligned with an inlet region of the cartridge 100. The lower rim of the clamping member 100 is aligned with and is designed to make contact with the peripheral flange 78 of the cartridge 70 in the closed position. Thus, in the closed or clamped, position the clamping member 100 applies a clamping force on the cartridge 70. This force is mainly applied to the central region of the cartridge 70 by the spigot 101 and to the inlet region of the cartridge 70 by the formation 79. However, if required the lower rim of the clamping member 100 may apply a relatively small force to the peripheral flange 78. At this point the piercer unit 121 is still lowered. Therefore the force applied to the cartridge 70 urges the cartridge into contact with the support surface 82. Thus, the lower membrane 77 carries some of the applied load in the area immediately surrounding the piercer aperture 83. In addition, the remainder of the load applied to the cartridge 70 is carried through the peripheral flange 78 where it contacts the support surface 82.

Closure of the upper mechanism 90 also triggers operation of the barcode reader 120 to read the barcode on the cartridge 70 by transmitting through the barcode window 84. The received detected signal is then fed to the controller which thereby determines the correct dispense parameters for the inserted cartridge, such as water temperature, volume, steeping time, etc.

Opening of the upper mechanism 90 after a dispense cycle and ejection have taken place results in a reversal of the movement of the cartridge guide 110 described above.

A particular advantage of this movement of the cartridge guide 110 is to allow accommodation of cartridges having a relatively deep profile, such as the type of cartridge 70 shown in FIGS. 9a to 9d. As shown in FIGS. 9a to 9d maintaining the cartridge guide 110 in the loading position of FIG. 9a until the clamping mechanism 93 has rotated partially down to the point shown in FIG. 9c allows the lower rim of the clamping member 100 to clear the upper rear point 73 of the cartridge 70. The subsequent rearward movement of the cartridge 70 allows for a clamping member 100 that closely conforms to the diameter of the cartridge to be used whilst avoiding fouling of the clamping member's rim on a front face 74 of the cartridge or of the spigot 101 on the sides of the relatively deep central well 75 of the cartridge 70. In this way the size of the clamping member 100 is minimised without requiring a substantially vertical movement of the clamping mechanism 93 to be used to allow insertion of cartridges of varying depth.

Figure 6:
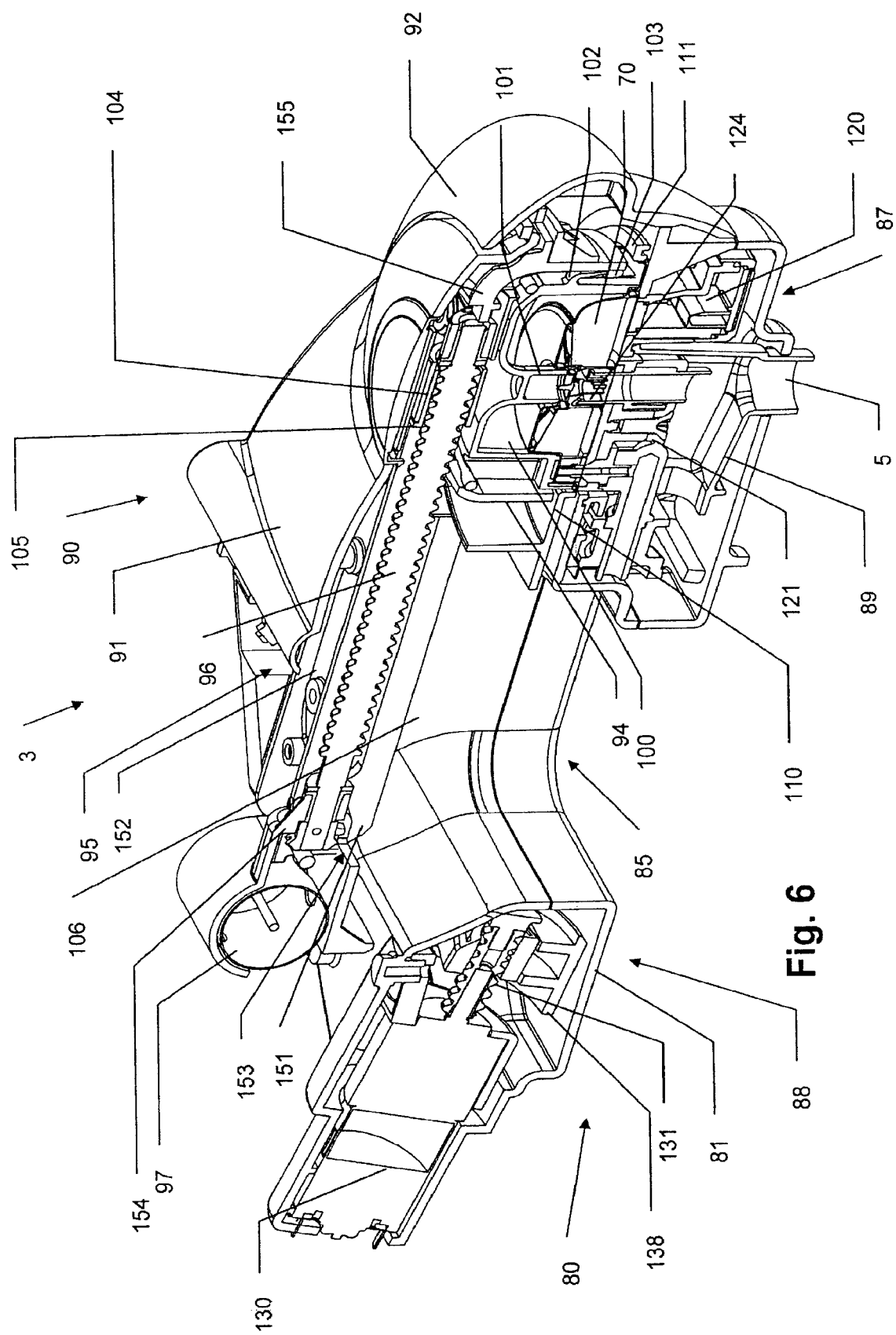
FIG. 6 is a cross-sectioned perspective view of the delivery head of FIG. 3 in the closed position with a piercing unit of the delivery head in a raised position.

As shown in FIG. 5, at this point the piercer unit 121 is in the lowered position such that the inlet piercer 123 and outlet piercer 124 are fully below the level of the support surface 82. On receipt of a start command from the user (by for example, pressing a start/stop button), the controller of the machine 1 operates the motor 130 to raise the piercing mechanism 119 into the raised position shown in FIG. 6 such that the inlet piercer 123 and outlet piercer 124 are raised proud of the level of the support surface 82. In the raised position the piercer unit 121 is raised to the point where the seal member 128 is orientated substantially horizontally with the general level of the seal member 128 being level with the support surface 82. However, in this position the raised annular portions 129 of the seal member 128 lie slightly above the level of the support surface 82.

In this way the raised annular portions 129 are able to distort slightly and thereby tension the flexible lower membrane 77 of the cartridge 70. The peripheral flange 78 of the cartridge 70 remains in contact with the support surface 82 due to the constraining contact of the lower rim of the clamping member 100.

In addition, the upward movement of the piercer unit 121 urges the cartridge 70 more tightly against the spigot 101 and the formation 79 of the clamping member 100 to increase the clamping force which holds the cartridge 70 in position between the clamping member 100 and the piercer unit 121. Thus, the combination of the action of the clamping member 100 and the piercer unit 121 creates a minimum clamping force of 30 N at the inlet of the cartridge and a force of between 75 and 130 N at the outlet.

The movement of the piercing mechanism 119 from lowered to raised position is most clearly seen in FIGS. 11a and 11b and involves a rotation of the piercer unit 121 about its pivot point of between 5 and 10 degrees and preferably greater than 7.5 degrees. On operation of the motor 130, the rear coupling member 138 is moved forwards by approximately 20 mm by rotation of the lead screw 131. As a result of the coupling of the rear coupling member 138 with the primary link 135 the primary link 135 is moved substantially in a direction in line with the longitudinal axis of the primary link although this may be accompanied by a slight rotational movement of the primary link 135 relative to the rear coupling member 138. At the same time the primary link arms 135a push on the lower ends of the secondary links 136. Due to the constraint of the tertiary links 137, which couple the primary link arms 135a and the secondary links 136 to the second pivot points 140, the pushing movement of the primary link arms 135a causes the secondary links 136 to rotate in a clockwise sense as viewed in FIG. 11b. This rotation results in upward rotation of the front coupling member 149 due to the coupling of the secondary links 136 to the front coupling member 149 and the coupling of the arms 148 of the front coupling member 149 to the first pivot points 139 of the side mounting plates 162. Upward rotation of the front coupling member 149 consequently results in upward rotation of the piercer unit 121 due to the rigid connection of the piercer unit 121 to the front coupling member 149. In the raised position, the tertiary links 137 are substantially vertical and also aligned with the secondary links 136 which are also vertically aligned. In this position the secondary and tertiary links are best able to resist the downward loads applied by the clamping member 100 to the cartridge 70. The movement of the secondary and tertiary links also acts in the manner of a toggle clamp wherein the secondary and tertiary links snap into, and have a propensity to remain in, the position of FIG. 11b until a positive retraction force is applied by the motor 130.

Raising of the piercing mechanism 119 causes piercing of the cartridge 70 by the inlet piercer 123 and the outlet piercer 124 to form respectively an inlet and an outlet in the underside of the cartridge 70.

Once the controller detects that the piercer unit 121 is in the raised position dispensation of a beverage from the cartridge 70 begins. As with operation of the lead screw 96 current sensing of the motor 130 may be used by the controller to determine the position of the piercer unit 121. Heated water is channelled from the fluid inlet 126 through the conduit 125 and inlet piercer 123 and into the cartridge. The resultant beverage is discharged through the outlet piercer 124, spout chute 89 and out of outlet 5 into a waiting receptacle 6.

Once dispensation has stopped the piercer unit 121 is lowered by reversing the operation described above by operating the motor 130 in a reverse direction. This clears the inlet piercer 123 and the outlet piercer 124 out of the ejection path of the cartridge 70 and also removes a portion of the loading applied to the cartridge 70.

Figure 7:
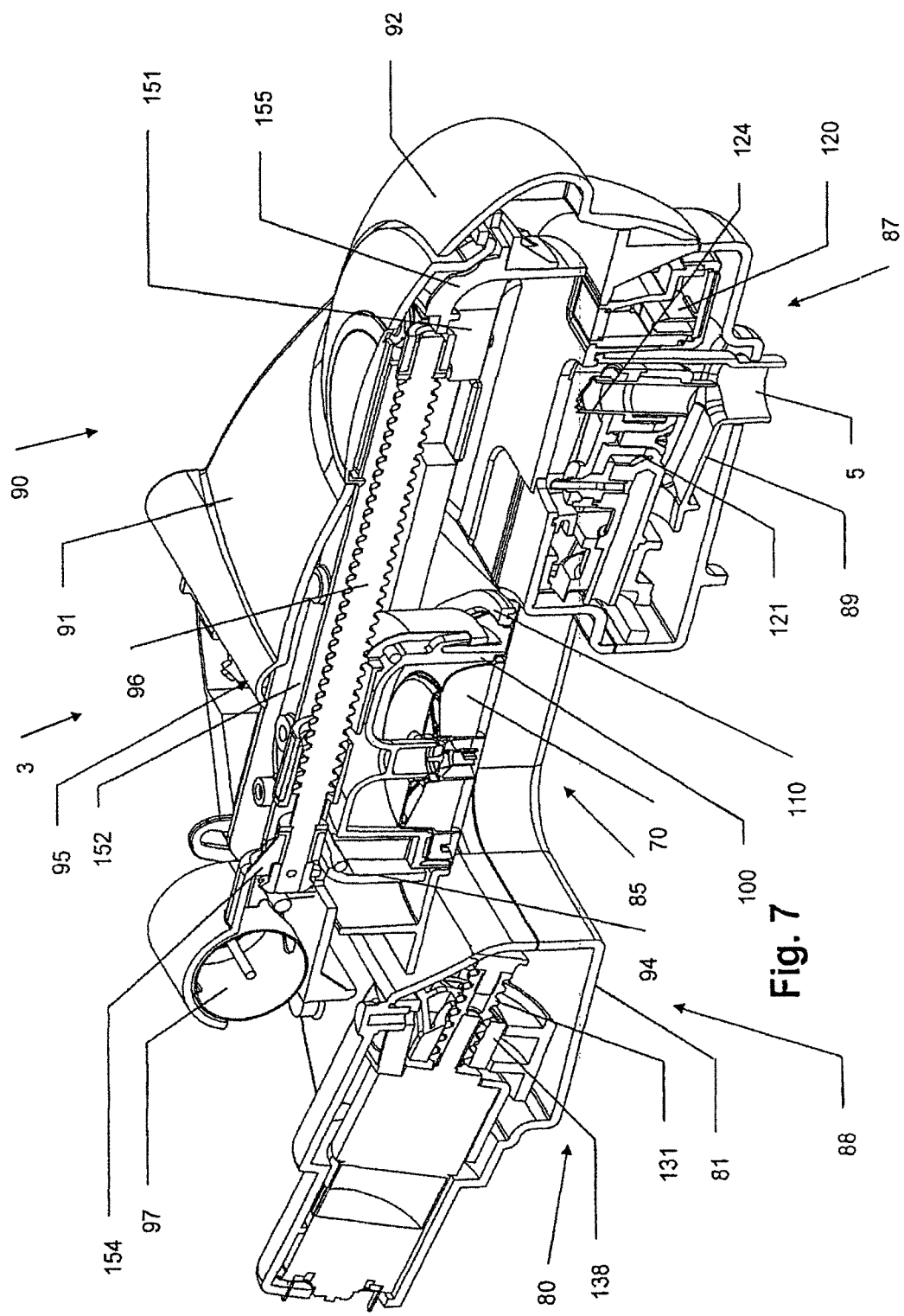
FIG. 7 is a cross-sectioned perspective view of the delivery head of FIG. 3 in an ejection position.

The controller then operates motor 97 to eject the cartridge 70 by movement of the cartridge 70 to an ejection position. Operation of the motor 97 rotates the lead screw 96 causing the clamping socket 94 and clamping member 100 to slide rearwards into the position shown in FIG. 7. The clamping member 100 moves the cartridge 70 along with it thereby dragging the cartridge 70 over the ejection chute 85. During this movement the cartridge 70 is still under some loading from the socket 94 of the upper mechanism 90. Once the cartridge 70 is substantially or wholly aligned with the chute 85 it falls under gravity down the chute 85 into a waste bin in a lower part of the machine 1. It is to be noted that during this movement the outer part of the housing 91 of the upper mechanism 90 remains stationary such that the motion of the clamping mechanism 93 remains internal to the delivery head 3. A particular advantage is that the delivery head 3 does not need to be opened in order to eject the cartridge 70. In addition, the clamping mechanism 93 affects not only clamping of the cartridge 70 during dispensation of beverage but also ejection of the cartridge 70.

The motor 97 is then reversed to move the clamping mechanism 93 back into the forward position ready for the next dispensing cycle.

Optionally a steam purge may be used to clean the piercer unit cavity 86, support surface 82, and clamping member 100. Steam is directed through the inlet piercer 123. The steam purge may be carried out with the piercer body 121 in the raised or lowered position. In addition, it may be carried out automatically after each dispensation cycle and or carried out from time to time under either manual user control or automatic control of the controller. A steam purge may also be used during the dispensation cycle when the cartridge 70 is in the dispensation position to dry out the cartridge 70 and to help drive out any remaining liquid in the cartridge 70.

The invention claimed is:

1. A cartridge for use in a beverage preparation machine, the cartridge comprising:
    a quantity of one or more beverage ingredients,
    a lower surface of the cartridge comprising an inlet and an outlet arranged to communicate respectively with an inlet and an outlet of a delivery head of the beverage preparation machine when the cartridge is inserted into the machine such that, in use, water from the inlet of the delivery head passes upwardly through the inlet of the cartridge and such that beverage produced from the water and the one or more beverage ingredients passes downwardly through the outlet of the cartridge to flow out of the outlet of the delivery head,
    the lower surface of the cartridge further comprising a barcode which, in use, is readable by a barcode reader of the beverage preparation machine for controlling operation of the beverage preparation machine,
    wherein the barcode, the inlet and the outlet of the cartridge are located in a straight line with the outlet being intermediate the inlet and the barcode,
    wherein the barcode includes a pair of opposing sides that extend parallel to the straight line.

2. A cartridge as claimed in claim 1 wherein the outlet is located at a centre or near a centre of the lower surface of the cartridge.

3. A cartridge as claimed in claim 1 wherein the inlet and the outlet of the cartridge are initially closed by one or more frangible membranes.

4. A cartridge as claimed in claim 1 wherein a centroid of the inlet, a centroid of the outlet and a centroid of the barcode lie on a straight line.

5. A cartridge as claimed in claim 1 wherein the barcode comprises a rectangular arrangement of coding lines, wherein a longer edge of the rectangular arrangement is arranged perpendicularly to the line joining the inlet, the outlet and the barcode, the longer edge connecting the opposing sides of the barcode.

6. A method of dispensing a beverage from a cartridge using a beverage preparation machine,
    the beverage preparation machine being of the type having a delivery head comprising: an inlet for supplying water to the cartridge, an outlet for beverage, a barcode reader having a barcode reader window, an ejection chute, and a clamping member;
    the barcode reader window and the ejection chute being located in a line with the inlet and the outlet, and the inlet and the outlet being intermediate the barcode reader window and the ejection chute;
    the cartridge being of the type comprising an inlet, an outlet and a barcode; the inlet, the outlet and the barcode being located in a straight line with the outlet intermediate the inlet and the barcode;
    wherein the barcode includes a pair of opposing sides that extend parallel to the straight line;

wherein the method comprises the steps of:
moving the clamping member into an open position;
inserting the cartridge into the delivery head;
moving the clamping member into a closed position such that the inlet, the outlet and the barcode of the cartridge are aligned respectively with the inlet, the outlet and the barcode reader window of the delivery head;
pumping water through the inlet of the delivery head and the inlet of the cartridge so as to form a beverage from the one or more beverage ingredients of the cartridge;
delivering said beverage out of the outlet of the insert and the outlet of the delivery head;
moving the clamping member from the closed position to an ejection position to move the cartridge into alignment with the ejection chute to achieve ejection of the cartridge from the delivery head;
wherein movement of the cartridge towards the ejection chute is such that the inlet and the outlet of the cartridge move away from, and do not pass over, or in the vicinity of, the barcode reader window of the delivery head.

\* \* \* \* \*